(12) United States Patent
Frick et al.

(10) Patent No.: US 12,222,824 B2
(45) Date of Patent: Feb. 11, 2025

(54) INFRASTRUCTURE BACKUP AND RECOVERY

(71) Applicant: Palantir Technologies Inc., Denver, CO (US)

(72) Inventors: Jakob Frick, London (GB); Samuel Sinensky, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/420,486

(22) Filed: Jan. 23, 2024

(65) Prior Publication Data
US 2024/0160536 A1  May 16, 2024

Related U.S. Application Data

(63) Continuation of application No. 17/845,468, filed on Jun. 21, 2022, now Pat. No. 11,880,285.

(60) Provisional application No. 63/339,916, filed on May 9, 2022.

(51) Int. Cl.
*G06F 11/14* (2006.01)
*G06F 11/07* (2006.01)

(52) U.S. Cl.
CPC ........ *G06F 11/1469* (2013.01); *G06F 11/076* (2013.01); *G06F 11/1435* (2013.01); *G06F 11/1451* (2013.01); *G06F 11/1464* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,269,381 B1 * | 7/2001 | St. Pierre | G06F 11/1469 |
| 9,152,504 B1 | 10/2015 | Bushman et al. | |
| 9,483,365 B2 * | 11/2016 | Schmidt | H04L 67/1014 |
| 9,626,367 B1 * | 4/2017 | Kokotovich | G06F 11/1464 |
| 10,127,119 B1 * | 11/2018 | Paulzagade | G06F 11/1471 |
| 11,507,473 B2 | 11/2022 | Yadav et al. | |
| 2008/0208929 A1 | 8/2008 | Phillipi | |

(Continued)

OTHER PUBLICATIONS

Y. Son et al., "SSD-Assisted Backup and Recovery for Database Systems," 2017 IEEE 33rd International Conference on Data Engineering (ICDE), San Diego, CA, USA, 2017, pp. 285-296, (Year: 2017).*

(Continued)

*Primary Examiner* — Daniel F. McMahon
(74) *Attorney, Agent, or Firm* — Sheppard Mullin Richter & Hampton LLP

(57) ABSTRACT

Computing systems, methods, and non-transitory storage media are provided for determining raw data and additional information from a first storage space to be backed up, obtaining a first snapshot of the raw data and the additional information at a first time, determining one or more parameters of the backing up process based on current or historical network conditions, generate, according to the one or more parameters, a first backup corresponding to the first snapshot at a second storage space, obtaining a second snapshot of the raw data and the additional information at a second time; and generating an incremental backup corresponding to the second snapshot at the second storage space.

20 Claims, 14 Drawing Sheets

(56) References Cited

U.S. PATENT DOCUMENTS

| | | | | |
|---|---|---|---|---|
| 2010/0146231 | A1* | 6/2010 | Gopalan | G06F 11/1458 711/E12.103 |
| 2010/0185921 | A1* | 7/2010 | Meller | G06F 11/1433 714/763 |
| 2011/0218966 | A1 | 9/2011 | Barnes et al. | |
| 2013/0151477 | A1* | 6/2013 | Tsaur | G06F 11/1469 707/E17.005 |
| 2014/0188805 | A1* | 7/2014 | Vijayan | G06F 16/113 707/646 |
| 2015/0378843 | A1* | 12/2015 | Nanivadekar | G06F 11/1451 707/679 |
| 2016/0110262 | A1* | 4/2016 | Nanivadekar | G06F 11/1469 707/654 |
| 2018/0137139 | A1* | 5/2018 | Bangalore | H04L 67/568 |
| 2019/0324861 | A1* | 10/2019 | Stowell | H04L 63/12 |
| 2021/0011815 | A1* | 1/2021 | Chandrashekar | G06F 11/1469 |
| 2022/0155962 | A1 | 5/2022 | Mundra et al. | |
| 2022/0188194 | A1 | 6/2022 | Liu et al. | |
| 2023/0229568 | A1 | 7/2023 | Naidu et al. | |

OTHER PUBLICATIONS

R. Akbar, M. S. Husain and M. Suaib, "Comparative study of various backup and monitoring techniques," 2015 International Conference on Green Computing and Internet of Things (ICGCIoT), Greater Naida, India, 2015, pp. 1530-1537, doi: 10.1109/ICGCIoT.2015.7380710. (Year: 2015).

Notice of Allowance mailed Sep. 20, 2023, issued in related U.S. Appl. No. 17/845,468 (16 pages).

* cited by examiner

INFRASTRUCTURE BACKUP AND RECOVERY

CROSS REFERENCE TO RELATED APPLICATIONS

This application is a continuation of U.S. application Ser. No. 17/845,468, filed Jun. 21, 2022, which claims the benefit under 35 U.S.C. § 119(e) of U.S. Provisional Application Ser. No. 63/339,916 filed May 9, 2022, the content of which is incorporated by reference in its entirety into the present disclosure.

FIELD OF THE INVENTION

This disclosure relates to approaches of backup and recovery of infrastructure.

BACKGROUND

Destructive events, such as disasters, attacks, software or hardware failure, or maintenance, may cause a shutdown or interruption of infrastructure. These negative events may cause a temporary data loss in applications, services, and platforms. In order to mitigate an impact of the temporary data loss, at least a portion of the data may be backed up and restored. Currently, data recovery mechanisms are largely inadequate. One report estimates that 60 percent of backups are incomplete and 50 percent of restores fail. The impacts of deficient data recovery mechanisms may be calamitous. Compromised functionality, productivity loss, and exposure of sensitive information are among the perils of incomplete data backup and recovery.

SUMMARY

Various examples of the present disclosure can include computing systems, methods, and non-transitory computer readable media having instructions that, when executed, cause one or more processors of the computing systems to perform certain functions targeted towards a backup to be generated and stored at one or more first data stores or first storage spaces. One or more of the computing systems are configured to obtain a snapshot of raw data and additional information from one or more second data stores or second storage spaces, and determine a subset of the raw data and the additional information to be backed up. One or more of the computing systems are configured to back up the subset of the raw data and the additional information corresponding to the snapshot to generate a first backup at one or more second data stores or second storage spaces. The one or more second data stores or second storage spaces may be within a common hardware or computing system in a different segment, or a different or external hardware or computing system, relative to the one or more first data stores or first storage spaces. In some examples, each backup operation may correspond to a stack such as a backup stack. The raw data and the additional information may have been stored separately within the one or more first data stores or first storage spaces. The snapshot of the raw data and the additional information may be at a first time. Within the backup, the raw data and the additional information may be stored in a common space.

The additional information may have been modified and/or modifiable by a user. Additionally or alternatively, write and/or read privileges of the additional information may be specific to the user or users. The raw data may be write-protected and/or write-restricted. The raw data and the additional information may differ in their respective storage and persistence requirements.

In some examples, the backing up of the subset of the raw data and the additional information may include preserving metadata of the raw data and the additional information. The metadata may include one or more timestamps, access control privileges, storage locations, sizes, duration of retention, and/or other characteristics or contextual information of the raw data and the additional information.

In some examples, derivative data that is derived or generated from the raw data or the additional information is at least partially excluded from the backup. Thereby, storage space consumed by the backup may be saved because the derivative data may be regenerated, for example, as a result of analysis and/or other data operations. The backup thus may be limited to any subset of the raw data and the additional information that cannot be regenerated.

In some examples, the raw data and the additional information may be integrated into the common space in the backup.

In some examples, one or more of the computing systems are configured to obtain a second snapshot of the raw data and the additional information from the second data stores or second storage spaces, determine any change or changes that have occurred in the raw data and the additional information, and back up the change or the changes as a second backup. In some examples, the second backup, and/or subsequent backups of the backup, include incremental backups, and are limited to a change or changes relative to a previous backup.

In some examples, one or more of the computing systems are configured to receive a request to restore the raw data and the additional information based on a previous, or most recent, backup. If the raw data and the additional information are originally stored separately in an external, or second, computing system, then the request may be from the second computing system or from a different external computing system, or a third external computing system. In response, one or more of the computing systems may transmit the raw data and the additional information without interruption to a current backup process. Thus, a backup at one or more of the computing systems may occur simultaneously with a restore.

In some examples, one or more of the computing systems are configured to receive an indication of a successful transmission of the raw data and the additional information. This indication may be manifested as a checksum. One or more of the computing systems may validate the checksum.

In some examples, the raw data and/or the additional information may include files from a distributed file system such as a Hadoop Distributed File System (HDFS). The snapshot and/or the second snapshot may be from the HDFS. In some examples, individual clusters in the HDFS may be unable to directly communicate. Thus, the backup and restore operations may be supported across clusters that are unable to directly communicate.

In some examples, the files may be of a JavaScript Object Notation (JSON) format. In some examples, the backing up may encompass transforming, using a wrapper, an original format of the raw data and/or the additional information into a different format, such as a structured format. For example, the original format may be a JSON format or geospatial data format.

In some examples, one or more of the computing systems are configured to constantly track metrics regarding one or more previous backups, such as a number, a rate, a change, and/or a rate of change of successful or failed backups. One or more of the computing systems are configured to adjust one or more parameters of a current or future backup based on one or more of the metrics. For example, if a number, rate, and/or a rate of change of failed backups exceed respective thresholds, one or more of the computing systems may decrease an amount of data transmitted during a backup or portion thereof.

Other metrics may include a time, for example, in seconds, since a most recent successful backup start, a time since a most recent backup start, a number of successful and failed backups per stack, a number of successful and failed tasks per stack, a latest start time and modified time for a backup run, a latest start time and modified time for a backup run, a latest start time and modified time (e.g., an end time) for a most recent successful backup run, a number of folders and a total byte size of the folders to be transferred.

In some examples, one or more of the computing systems are configured to determine and/or record a number of folders to transmit or transfer to the external computing system or the second external computing system and a size, for example in bytes, of these folders backed up within the one or more of the computing systems, in response to a request to restore.

In some examples, one or more of the computing systems are configured to adjust parameters, such as an amount of data transmitted during a backup or portion thereof, based on a network connection parameter, such as a speed and/or bandwidth.

Some further examples, as explained below, are targeted towards a restore. In some examples, one or more of the computing systems are configured to In some examples, a computing system includes one or more processors; and memory storing instructions that, when executed by the one or more processors, cause the system to: determine raw data and additional information from a first storage space to be backed up, wherein the raw data and the additional information have different storage and persistence characteristics; obtain a first snapshot of the raw data and the additional information at a first time; determine one or more parameters of the backing up process based on current or historical network conditions; generate, according to the one or more parameters, a first backup corresponding to the first snapshot at a second storage space; obtain a second snapshot of the raw data and the additional information at a second time; and generate an incremental backup corresponding to the second snapshot at the second storage space.

In some examples, the raw data is write-restricted and the additional information is write-privileged for at least one user.

In some examples, the backing up comprises preserving metadata of the raw data and of the additional information, the metadata comprising: one or more timestamps, access control privileges, storage locations, sizes, or durations of retention.

In some examples, derivative data that is derived or generated from the raw data or the additional information is at least partially excluded from the backup.

In some examples, the instructions that, when executed by the one or more processors, cause the system to: receive, from the first storage space or a third storage space, a request to restore the raw data and the additional information based on the backup and the incremental backup; and in response to receiving the request, transmit the raw data and the additional information according to the backup and the incremental backup to the first storage space or the third storage space while continuing a current backup process.

In some examples, the instructions that, when executed by the one or more processors, cause the system to: determine whether the backup is successful based on respective checksums of the raw data and the additional information.

In some examples, the raw data and the additional information comprise files from a distributed file system.

In some examples, the raw data has a JavaScript Object Notation (JSON) format.

In some examples, the instructions that, when executed by the one or more processors, cause the system to: determine a metric indicative of a performance of the backup, the metric comprising a speed of the backup, a change in speed of the backup, a rate of successful backups, or a change in the rate of successful backups; and adjust the one or more parameters based on the metric.

In some examples, the adjusting of the one or more parameters comprises decreasing an amount of data transmitted during a session of the backup or the future backup in response to a rate of successful backups decreasing below a threshold rate.

In some examples, the instructions that, when executed by the one or more processors, cause the system to: determine a network connection parameter of a network between the first storage space and the second storage space; and adjust the one or more parameters based on the network connection parameter.

In some examples, a computer-implemented method of a computing system, the computer-implemented method comprising: determining raw data and additional information from a first storage space to be backed up, wherein the raw data and the additional information have different storage and persistence characteristics; obtaining a first snapshot of the raw data and the additional information at a first time; determining one or more parameters of the backing up process based on current or historical network conditions; generating, according to the one or more parameters, a first backup corresponding to the first snapshot at a second storage space; obtaining a second snapshot of the raw data and the additional information at a second time; and generating an incremental backup corresponding to the second snapshot at the second storage space.

In some examples, the raw data is write-restricted and the additional information is write-privileged for at least one user.

In some examples, the backing up comprises preserving metadata of the raw data and of the additional information, the metadata comprising: one or more timestamps, access control privileges, storage locations, sizes, or durations of retention.

In some examples, derivative data that is derived or generated from the raw data or the additional information is at least partially excluded from the backup.

In some examples, the method comprises receiving, from the first storage space or a third storage space, a request to restore the raw data and the additional information based on the backup and the incremental backup; and in response to receiving the request, transmitting the raw data and the additional information according to the backup and the incremental backup to the first storage space or the third storage space while continuing a current backup process.

In some examples, the method comprises determining whether the backup is successful based on respective checksums of the raw data and the additional information.

In some examples, the raw data and the additional information comprise files from a distributed file system.

In some examples, the method further comprises determining a metric indicative of a performance of the backup, the metric comprising a speed of the backup, a change in speed of the backup, a rate of successful backups, or a change in the rate of successful backups; and adjusting the one or more parameters based on the metric.

In some examples, the adjusting of the one or more parameters comprises decreasing an amount of data transmitted during a session of the backup or the future backup in response to a rate of successful backups decreasing below a threshold rate.

In some examples, the method comprises determining a network connection parameter of a network between the first storage space and the second storage space; and adjusting the one or more parameters based on the network connection parameter.

In some examples, a computing system comprises one or more processors; and memory storing instructions that, when executed by the one or more processors, cause the system to: determine raw data and additional information from a first storage space to be restored at a second storage space, wherein the raw data and the additional information have different storage and persistence characteristics; transmit the raw data and the additional information to the second storage space; and simultaneously receive an updated backup corresponding to an updated version of the raw data and the additional information.

In some examples, the transmission occurs over multiple sessions, and an amount of data transmitted during each session depends on a quality of a network connection of a network between the first storage space and the second storage space.

In some examples, the instructions that, when executed by the one or more processors, cause the system to: receive, following the transmission and a restoration, an indication of a change in the raw data; and in response to receiving the indication, retransmit the raw data.

In some examples, the raw data and the additional information comprise files; and the instructions that, when executed by the one or more processors, cause the system to: compare hash representations of files following restoration with those of the stored in the first storage space to determine a validity of the restoration.

In some examples, the instructions that, when executed by the one or more processors, cause the system to: restore one or more repositories and one or more platforms, wherein the repositories segregate the raw data from the additional information.

In some examples, the instructions that, when executed by the one or more processors, cause the system to: obtain keys of the raw data; determine a hashed value of the keys; determine, based on the hashed values, one or more particular servers to which the raw data is to be restored.

In some examples, the particular servers are each dedicated to specific ranges of hashed values.

In some examples, the instructions that, when executed by the one or more processors, cause the system to: convert the raw data and the additional information to be restored into a JSON format.

These and other features of the computing systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 2A and 2B illustrates an initial backup.

In FIG. 4, previous versions of raw data and/or additional information may have been deleted and/or moved.

DETAILED DESCRIPTION

Figure 1:
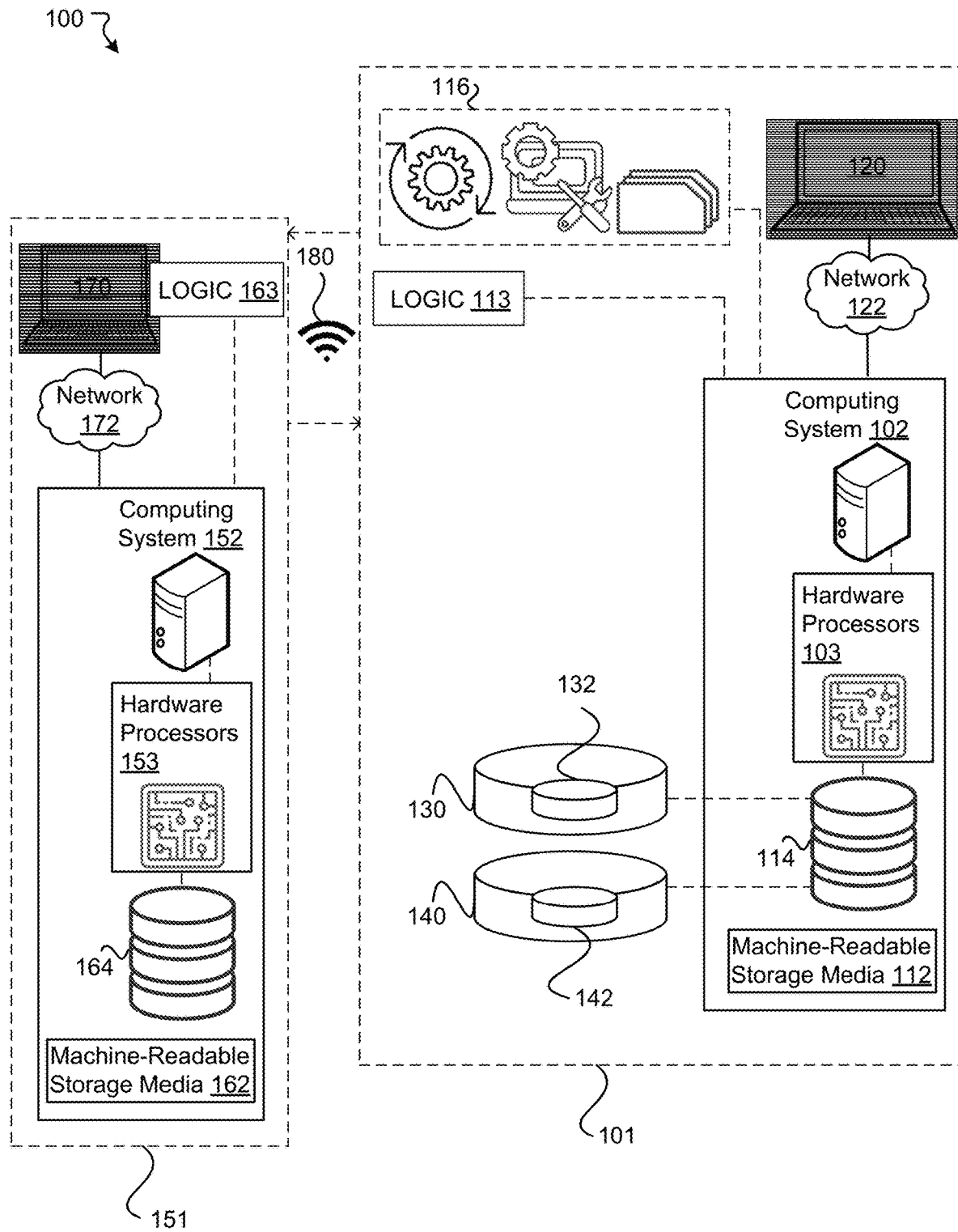
FIG. 1 illustrates an example environment or scenario (hereinafter "environment"), in accordance with various embodiments, of a computing system that performs a backup, and a second computing system that performs a restore.

Conventional approaches of backing up and/or restoring may be slow and/or inadequate particularly under scenarios of limited network connectivity. Additionally, speeds of backing up and/or restoring may be constrained by a lack of ability to back up an updated version of data while simultaneously restoring based on a previous version of data in a different segment or different computing system. Additionally, backing up and synchronizing different types and/or segments of data remains challenging.

To address these and other shortcomings, a new approach of backing up and restoring encompasses a first computing system that performs backups and a second computing system to which a previous backup is restored. In each backup, the first computing system may obtain a snapshot of raw data and additional information from the second computing system. The raw data and the additional information may differ in their respective storage and persistence requirements. The raw data may include unmodified data, which is write protected, and/or can only be written over from or modified by particular sources. In some examples, the raw data may not be modified or modifiable by users. The additional information may encompass user-created or user-modified data or information, and/or results of analyses or decisions performed by users. In some examples, the user-modified data or information may be write-privileged for a specific user or subset of users. The snapshot of raw data and additional information may be taken at a common time, such as a first time. This snapshot may correspond to a first, or initial, backup. Subsequent snapshots may be taken at subsequent times. To save storage space, subsequent backups may be limited to changes of the raw data and additional information that have occurred since a previous backup. Meanwhile, the restoring process includes a first validation of any raw data and additional information that has been restored or transferred to the second computing system according to a backup at the first computing system and a second validation to confirm an operation performed on the restored or transferred raw data and additional information, such as a join or merge, or other data transformation operation.

Although much of the foregoing description focuses on separate computing systems performing the backups and the restore, in alternative examples, the backups and the restore may be on a common computing system but different segments thereof. In such a scenario, the backup would occur in a first storage space within a computing system and the restore would be targeted at a second storage space within the computing system.

In such a manner, data and/or information having different storage and/or persistence requirements may nonetheless be time-synchronized, backed up, and restored. Additionally, processes of backing up data and restoring from a previous backup do not interfere with each other. Moreover, the backup and restoring may be adapted to be performed under a gamut of network conditions. These features increase a speed and reliability of backing up and restoring data, and result in the backup and restoration of data being more content aware and holistic, because more types and/or formats of data or information are backed up and restored.

FIG. 1 illustrates an example environment 100, in accordance with various examples, of a backup and restore infrastructure. The example environment 100 may encompass first infrastructure 151 including a first computing system 152 that performs backing up of data, for example, at one or more first storage spaces 164. The first infrastructure 151 may communicate, over a network 180, with second infrastructure 101, which may be associated with a location of data to be backed up and/or restored. The example environment 100 can also include at least one first computing device 170. In general, the first computing device 170 may be operated by an entity such as a user. The user may submit a request or query through the first computing device 170. In some examples, the user may be an administrative user that requests information or provides feedback regarding any of the backups from the first computing system 152. In some examples, the first computing device 170 may visually render any outputs generated from the first computing system 152. In general, the user can interact with the first computing system 152 directly or over a network 172, for example, through one or more graphical user interfaces and/or application programming interfaces.

The first computing system 152 and the first computing device 170 can each include one or more processors and memory. Processors can be configured to perform various operations by interpreting machine-readable instructions, for example, from a machine-readable storage media 162. The processors can include one or more hardware processors 153 of the first computing system 152. In some examples, one or more of the hardware processors 153 may be combined or integrated into a single processor, and some or all functions performed by one or more of the hardware processors 153 may not be spatially separated, but instead may be performed by a common processor. The hardware processors 153 may further be connected to, include, or be embedded with logic 163 which, for example, may include protocol that is executed to carry out the functions of the hardware processors 153. These functions may include obtaining a snapshot of raw data and additional information from one or more second data stores or second storage spaces (hereinafter "second storage spaces") 114 from or associated with the second infrastructure 101, which includes a second computing system 102. Although in FIG. 1, the first storage spaces 164 and the second storage spaces 114 are illustrated as belonging to or associated with different computing systems and/or different infrastructure, in some examples, the first storage spaces 164 and the second storage spaces 114 may belong to or be associated with a same computing system; thus backing up and restoring may occur in different segments of a same computing system. In some examples, the first storage spaces 164 may be integrated internally with the hardware processors 153. In other embodiments, the first storage spaces 164 may be separate from but communicatively connected to the hardware processors 153.

Meanwhile, the second storage spaces 114 may be further partitioned into a first section 130 and a second section 140, which may be used to separate data having different storage and/or persistence requirements. For example, the first section 130 may be used to store raw data while the second section 140 may be used to store additional information. As previously alluded to, the raw data may include unmodified data and/or persistent data, which may be write protected, and/or can only be written over from or modified by particular sources. In some examples, the raw data may be from a different source, other than users, and may not be modified or modifiable by users. The raw data may be readable by a subset of users. The raw data may include data that is ingested or obtained from incidents, and generated and/or transformed data, such as analyzed, merged, inferred, or evaluated information. Meanwhile, the additional information may encompass user-created or user-modified data or information. In some examples, the user-modified data or information may be write-privileged for a specific user or subset of users.

In some other examples, the raw data and/or the additional information may reside in a caching or indexing layer. The raw data and/or the additional information may originate from a cache, and/or be part of, or used to index other data.

The first section 130 may be divided into at least one segment 132. Although one segment 132 is shown for purposes of simplicity, the first section 130 may be understood to include multiple segments. As an example, one segment may include, and/or store data related to, a particular external source such as log records. Therefore, each segment may be particularly tailored to or restricted to storage and management of resources having a particular purpose and/or of a particular subject matter. Such segregation of resources in different segments may be desirable in scenarios in which access to, dissemination, and/or release of resources from one external source are to be determined and managed separately from those resources from other external sources, and only specific users may have access to one or more particular segments of resources. Similarly, the second section 140 may also be divided into at least one segment 142.

Additionally or alternatively, the first section 130 may be divided into multiple segments in order to sequester access to particular information based on access control levels or privileges of each of the segments. For example, each segment may be, or be labelled as, accessible only by persons (e.g., users operating the computing device 120) having one or more particular access control levels or privileges. The demarcation of information within the first section 130 into segments, such as the segment 132, provides clear delineations, classification levels and/or access constraints across each of the segments. As an example, one segment may have a classification level of "confidential," while another segment may have a classification level of "top secret." A classification level of a segment may indicate or define a maximum classification level of information or resources that are permitted within the segment. In particular, if one segment has a classification level of "confidential," then information or resources classified up to and including, or, at or below a level of, "confidential" may be permitted to be ingested into the segment while information or resources classified at a level higher than "confidential" may be blocked or restricted from being ingested into the segment. In some examples, the classification levels may be inherited or transferred from already defined classification levels of the external sources. In some examples, the classification levels may be automatically or manually set. Same or similar principles may also apply to the segment 142 of the second section 140.

Additionally or alternatively, the first section 130 and the second section 140 may be part of a distributed database.

Meanwhile, in the second infrastructure 101, the second computing system 102 and a second computing device 120 can each include one or more processors and memory. Processors can be configured to perform various operations by interpreting machine-readable instructions, for example, from a machine-readable storage media 112. The processors can include one or more hardware processors 103 of the second computing system 102. In some examples, one or more of the hardware processors 103 may be combined or integrated into a single processor, and some or all functions performed by one or more of the hardware processors 103 may not be spatially separated, but instead may be performed by a common processor. The hardware processors 103 may further be connected to, include, or be embedded with logic 113 which, for example, may include protocol that is executed to carry out the functions of the hardware processors 103. These functions may include, for example, performing a restore based on a previous backup stored within the first storage spaces 164, while simultaneously receiving an updated backup. The restoring may be performed in a different segment of a common computing system as the receiving of the updated backup. Thus, the restoring and the backup process do not interfere with each other.

The second computing system 102 may further include a platform 116. The platform 116 may include and store code and/or functionalities to perform data operations such as transformations.

Figure 2A:
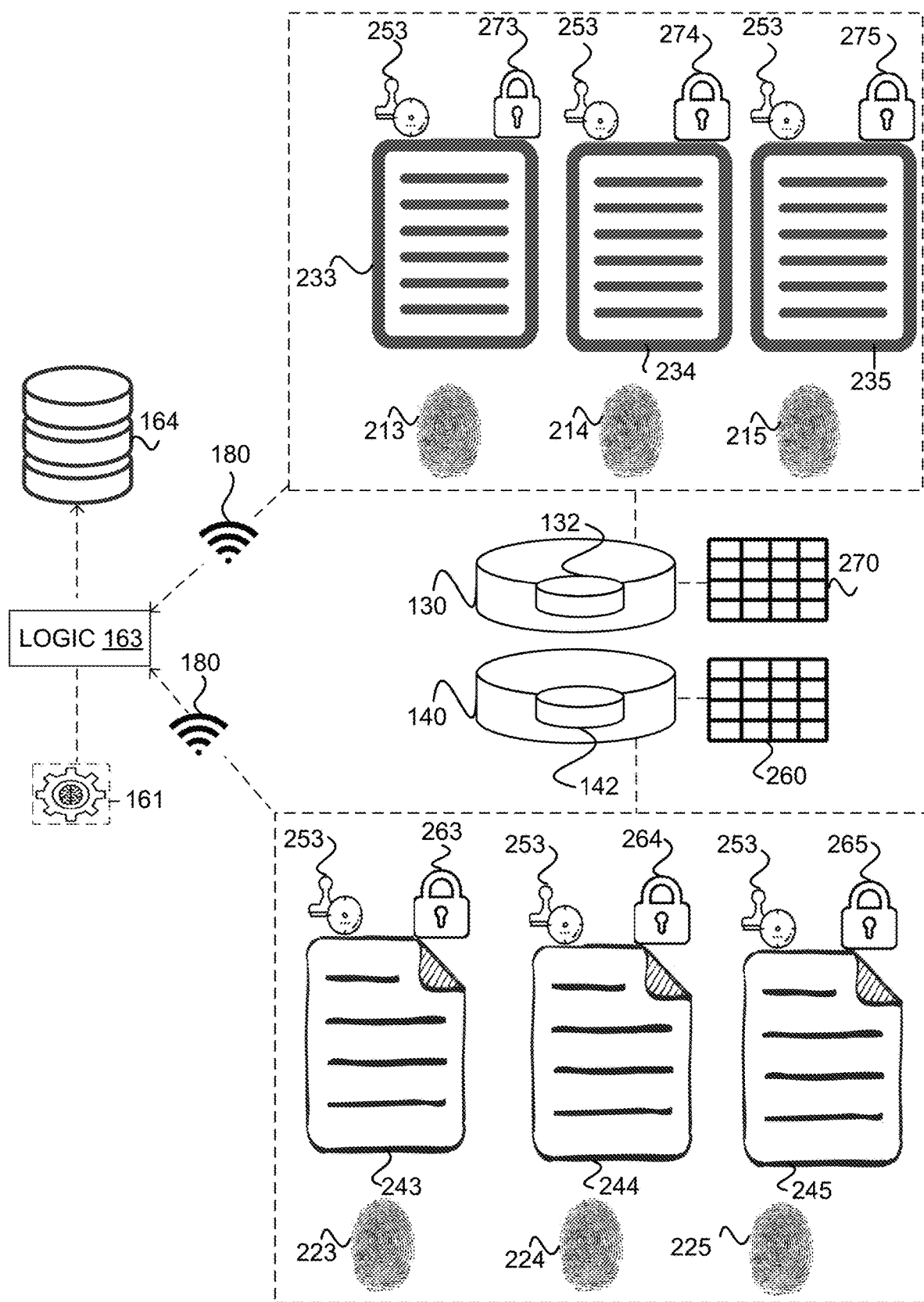
FIGS. 2A and 2B illustrate, in accordance with various examples, operations of backing up raw data and additional information.

FIG. 2A illustrates a scenario in which raw data 233, 234, and 235 from the first section 130 and additional information 243, 244, and 245 from the second section 140 of the second storage spaces 114 of the second infrastructure 101 may be backed up into the first storage spaces 164 of the first infrastructure 151. Although not illustrated, in some examples, the backup may occur at multiple infrastructures or computing systems, sometimes simultaneously or partially simultaneously. Additionally or alternatively, the backup may occur in virtual infrastructures, such as a cloud. Although three pieces or files of the raw data, and three files or pieces of the additional information, are illustrated, the raw data and the additional information may include any number of files or pieces. The raw data 233, 234, and 235 may reside in different layers compared to the additional information 243, 244, and 245. The raw data 233 may be timestamped with a timestamp 253 and have access control restrictions, levels, and/or policies (hereinafter "policies" 273) at a time corresponding to the timestamp 253. The timestamp 253 may correspond to a snapshot at which the raw data 233 was taken or obtained. The access control policies 273 may indicate specific users or classifications that are authorized to view the raw data 233, and/or an extent to which each classification is authorized to view the raw data 233. The access control policies 273 may also encompass dissemination controls or release controls. Similarly, the raw data 234 may be timestamped with the timestamp 253 and have access control policies 274. The raw data 235 may be timestamped with the timestamp 253 and have access control policies 275. Principles of the access control policies 274 and 275 may be implemented in a manner similar to the access control policies 273.

Meanwhile, the additional information 243 may be timestamped with the timestamp 253 and have access control policies 263. For example, the access control policies 263 may indicate that a particular first user has read and/or write access to the additional information 243. The particular first user may identify other users that have read and/or write access to the additional information. In some examples, only the first user has read and/or write access to the additional information 243. The additional information 244 may be timestamped with the timestamp 253 and have access control policies 264. The additional information 245 may be timestamped with the timestamp 253 and have access control policies 265. Principles of the access control policies 264 and 265 may be implemented in a manner similar to the access control policies 263.

Overall, the timestamps may be uniform across the raw data 233, 234, and 235 and the additional information 243, 244, and 245, indicating that a single snapshot was obtained corresponding to the timestamp 253. Therefore, data having different storage and persistence requirements, such as the raw data 233, 234, and 235 and the additional information 243, 244, and 245, which may reside across different layers, may be synchronized and stored together within the first storage spaces 164, and/or integrated within a single layer, when backed up. Respective timestamps and access control policies of the raw data 233, 234, and 235 and the additional information 243, 244, and 245 may be part of metadata, or contextual information, that is also backed up, recorded, or memorialized within the first storage spaces 164. The metadata may further include storage locations, sizes, duration of retention, and/or other characteristics or contextual information.

The logic 163 may obtain the snapshot of the raw data 233, 234, and 235 and the additional information 243, 244, and 245 corresponding to the timestamp 253. The obtaining of the snapshot may encompass receiving the snapshot, as transmitted by the logic 113, or extracting the snapshot from the second infrastructure 101 such as the second storage spaces 114. The logic 163 may determine whether the backup is validated by based on respective checksums of the raw data 233, 234, and 235 and the additional information 243, 244, and 245. Additionally or alternatively, the logic 163 may compare hash representations and/or fingerprints of the backed up raw data 233, 234, and 235, the additional information 243, 244, and 245, and/or metadata, to fingerprints 213, 214, 215, 223, 224, and 225. The fingerprints corresponding to the backup identify contents and/or metadata of a completed backup. Meanwhile, the fingerprints 213, 214, 215, 223, 224, and 225 may correspond to the raw data 233, 234, and 235, the additional information 243, 244, and 245, and the metadata within the second infrastructure 101. This validation may occur at a checkpoint. If the respective fingerprints of the backup match those within the second infrastructure 101, the logic 163 may validate the backup. Otherwise, if the fingerprints fail to match, the backup process may be repeated until the fingerprints match.

Parameters or characteristics of the backing up of the raw data 233, 234, and 235 and the additional information 243, 244, and 245, may depend on attributes of the network connection 180 between the first infrastructure 101 and the second infrastructure 151. For example, the attributes may include a speed, a stability, and/or a bandwidth of the network connection 180, current and/or historical, such as within a previous 24 hours. The logic 163 may detect the attributes of the network connection 180 and adjust the parameters of the backing up process based on the attributes, an amount of data, types, and/or formats of data to be backed up. In particular, the logic 163 may determine, based on the attributes, an amount of data to be backed up in each session and a number of sessions to back up an entirety of the raw data including the raw data 233, 234, and 235 and the additional information including the additional information 243, 244, and 245. For example, if the speed or stability of the network connection 180 is low, or below a threshold, then an amount of data to be backed up in each session may also be low, or below a threshold amount, to lower a risk of transmission failure and mitigate further delays. In contrast, if the speed or stability of the network connection is high, or above the threshold, then an amount of data to be backed up in each session may also be high, or above the threshold amount, to reduce a number of sessions, which may be correlated to an amount of time consumed by the backing up.

In some examples, characteristics or metrics of a backup process may be constantly generated and monitored. Such characteristics or metrics may facilitate convenient troubleshooting and/or diagnosis, especially in high-scale production environments. Monitoring may increase a level of fault tolerance or resilience by increasing flexibility of automatic or manual adjustment in an event of failure or change. If certain performance indicators, such as rate of transfer, fall below certain thresholds over a certain duration of time, or at any specific instance of time, the backup process may be paused, terminated, or adjusted by the logic 163, and/or settings of the backup process may be manually adjusted. In some examples, one of, or a combination of characteristic or metrics, which may include certain performance indicators and network conditions (e.g., bandwidth, speed, congestion), may fail to satisfy respective threshold conditions. This failure may cause the backup process to be paused or terminated. In some examples, the characteristics or metrics may encompass a number, a rate, a change, and/or a rate of change of successful or failed backups may be monitored. Additionally or alternatively, the characteristics or metrics may further encompass a time since a most recent successful backup, and/or ages of stored backups that indicate how long ago each of the stored backups was obtained. Other non-limiting examples of characteristics or metrics may include an amount of data transferred in an entire backup and/or during incremental stages, and/or a rate at which a current backup is occurring, such as a data transfer rate, or a first or second derivative of the data transfer rate. In some examples, characteristics or metrics may relate to those occurring over one or more given time intervals, such as 24-hour intervals, or one-hour intervals. The logic 163 may adjust one or more parameters of a current or future backup based on one or more of the metrics. For example, if a number, rate, and/or a rate of change of failed backups exceed respective thresholds, one or more of the computing systems may decrease an amount of data transmitted during a backup or portion thereof.

Figure 2B:
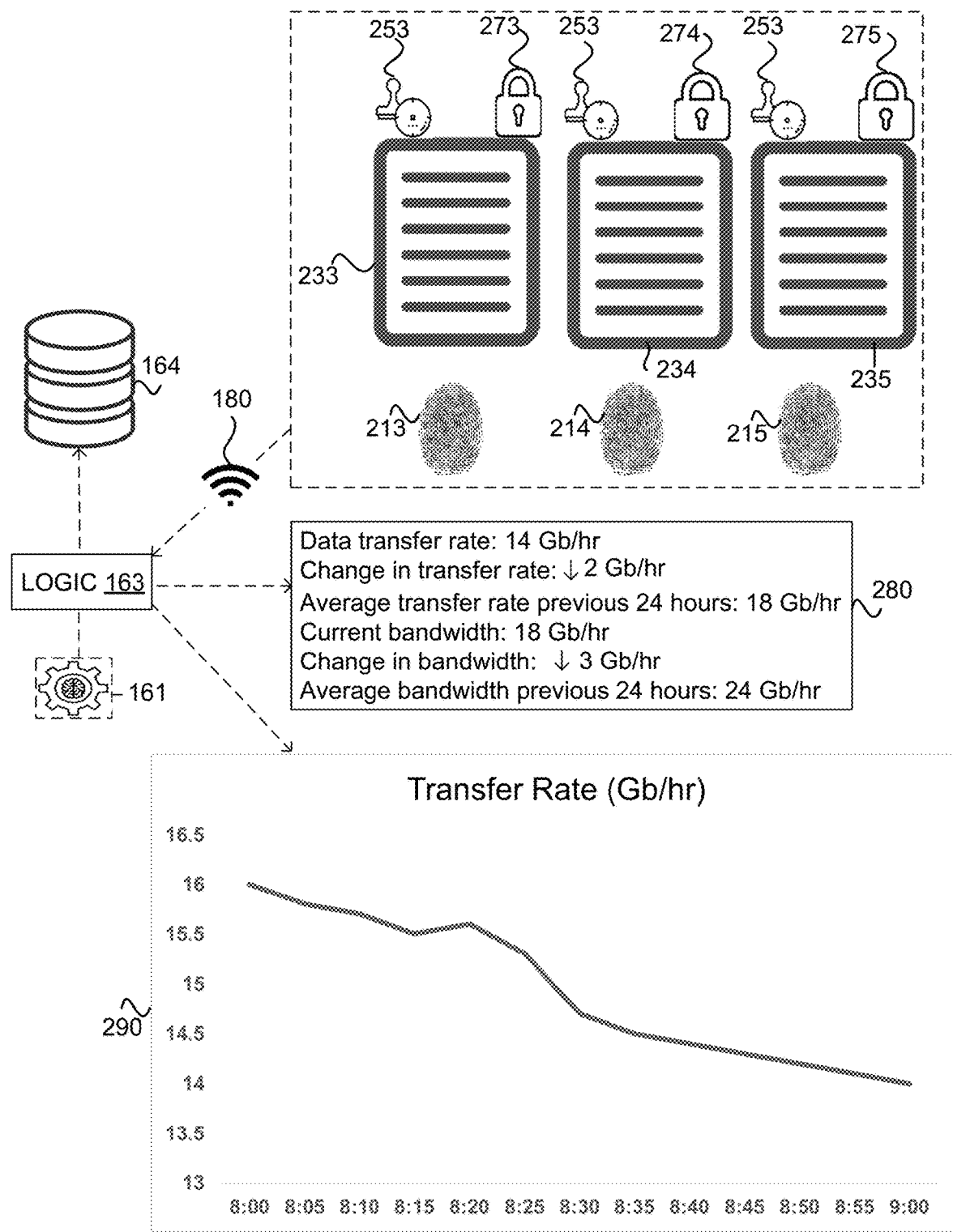

FIG. 2B illustrates the constant monitoring of metrics. The logic 163 may generate metrics 280 and 290 which may have different formats, such as text, log, and/or pictorial. The metrics 280 and/or 290 may pertain to an overall backup process, a subset of raw data or files being backed up, such as the raw data 233, 234, and 235, or a particular file being backed up. For example, the metrics 280 may capture a current data transfer rate, a change in transfer rate, for example, compared to a previous time, such as one hour ago, and an average transfer rate over an interval of time, such as over a most recent 24 hours. The metrics 280 may additionally capture a current bandwidth, a change in bandwidth, for example, compared to a previous time, such as one hour ago, and an average transfer rate over the interval of time, such as over a most recent 24 hours. In some examples, the metrics 280 may also indicate a ratio or proportion between data transfer rate and bandwidth, which may be indicative of an amount of congestion over the network 180. For example, if the logic 163 determines that any of the aforementioned metrics 280 fall outside of, or under, certain thresholds or threshold ranges, the logic 163 may automatically adjust settings for a current backup or a future backup, such as, decreasing an amount of data to be transferred, or an incremental amount of data transferred. Additionally or alternatively, the logic 163 may facilitate manual adjustment by outputting a warning if any of the aforementioned metrics 280 fall outside of, or under, certain thresholds or threshold ranges.

In some examples, the determination of the parameters of the backing up process, and/or determination of whether to terminate, pause, or adjust the backing up process, may be performed at least in part by a machine learning component or model (hereinafter "machine learning component") 161. The machine learning component 161 may be improved by iterative feedback. For example, if selection of certain parameters were correlated with low performance metrics, then the machine learning component 161 may adjust one or more weights of features or attributes to update its process of determining parameters.

The machine learning component 161 may be trained using at least two subsets of training data sequentially. A first subset of training data may be generated, either by the computing system 152 or a separate computing system, and include examples regarding particular scenarios (e.g., network conditions, parameters of a backup operation) and determinations corresponding to these scenarios. A second subset of training data may be generated, either by the computing system 152 or a separate computing system, and include examples that the machine learning component 161 incorrectly inferred during training, or having threshold similarities to the examples that were incorrectly inferred by the machine learning component 161. In such a manner, the machine learning component 161 may be improved by retraining on examples in which the machine learning component 161 performed worst.

Within the second infrastructure 101, a snapshot corresponding to a particular timestamp, such as the timestamp 253, may be indexed by indices 270 and 260, respectively corresponding to the first section 130 and the second section 140. The indices 270 and 260 may, additionally or alternatively, distinguish other properties of the raw data 233, 234, and 235 and the additional information 243, 244, and 245, including, for example, access control policies, hash representations of the raw data and the additional information, and/or types and/or formats of the raw data and the additional information, such as object-oriented, tabular, JSON, unstructured, or structured. In some examples, snapshots may be deleted or purged from the first storage spaces 164 and/or from the second storage spaces 114 based on their age, or an amount of time between their respective timestamps and a current time.

Figure 3:
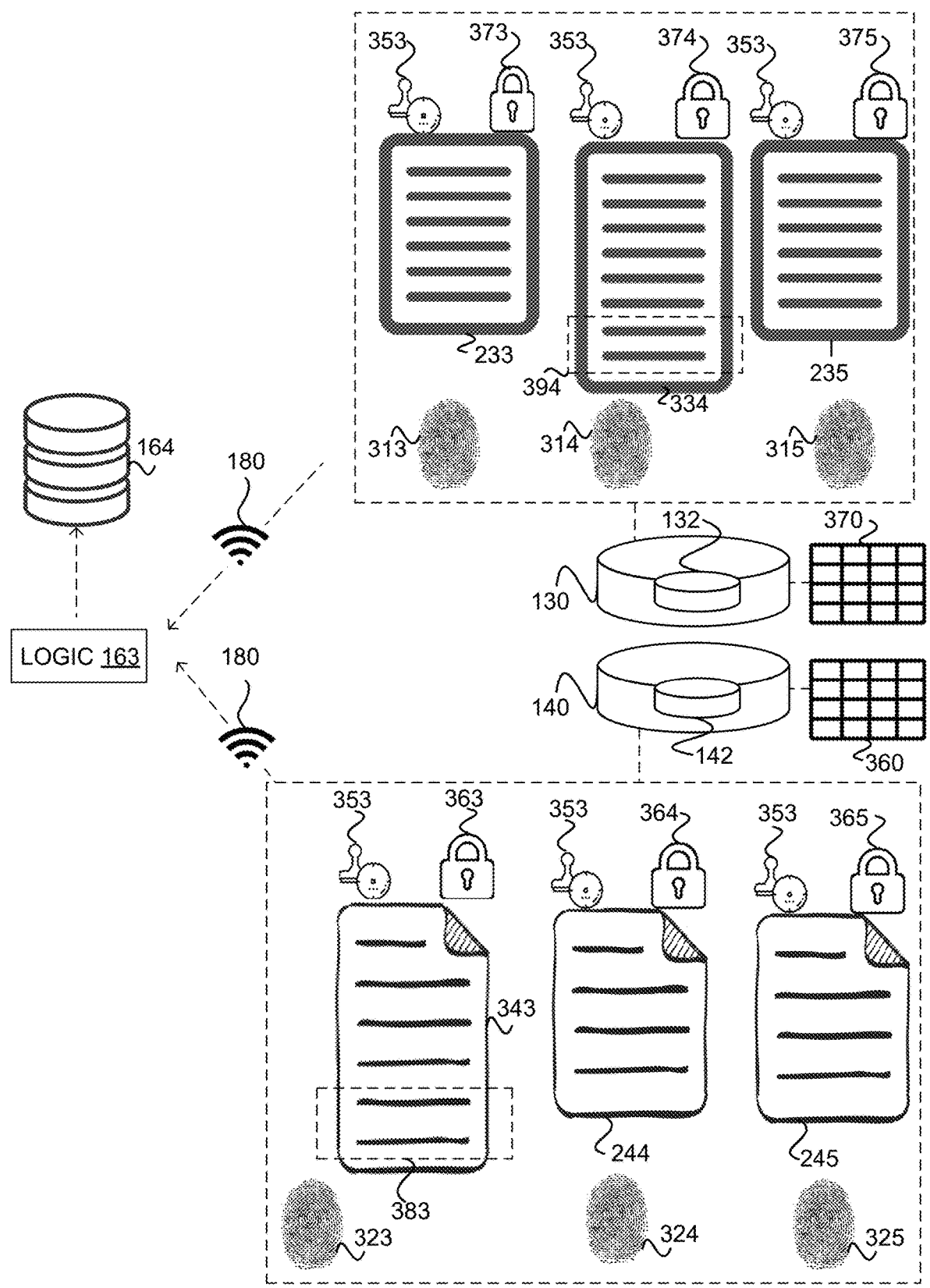
FIG. 3 illustrates, in accordance with various examples, operations of incrementally backing up raw data and additional information, by backing up any changes in the raw data and additional information compared to a previous backup.

Next, FIG. 3 illustrates a continuing of the backup process from FIGS. 2A and 2B. In FIG. 3, the logic 163 may perform an incremental backup that further backs up, loads, or saves changes in the raw data 233, 234, and 235, and the additional information 243, 244, and 245 into the first storage spaces 164, which have occurred since the timestamp 253. The logic 163 may create a checkpoint to verify consistency between the backup and a restore, and to determine incremental changes that have occurred to the raw data 233, 234, and/or 235, and/or the additional information 243, 244, and/or 245 within the second infrastructure 151. In particular, the logic 163 may obtain such changes corresponding to an updated timestamp 353. Thus, the changes would have occurred between the timestamps 353 and 253. Here, the raw data 233 may be unchanged at the timestamp 353. Meanwhile, the raw data 234 may have changed to raw data 334 at the timestamp 353. Differences between the raw data 234 and the raw data 234 are encapsulated by changed data 394. The changed data 394 may include modifications, additions, and/or deletions. The raw data 235 may remain unchanged. Meanwhile, any changes in access control policies 373, 374, and 375, compared to the access control policies 273, 274, and 275, of the raw data 233, 334, and 235, respectively, may also be uploaded, saved, or backed up into the first storage spaces 164.

Similarly, the additional information 243 may have changed to additional information 343. Differences between the additional information 243 and the additional information 343 may be encapsulated by changed information 383. The changed information 383 may include modifications, additions, and/or deletions. The additional information 244 and 245 may remain unchanged. Meanwhile, any changes in access control policies 363, 364, and 365, compared to the access control policies 263, 264, and 265, of the additional information 343, 244, and 245, respectively, may also be uploaded, saved, or backed up into the first storage spaces 164.

Therefore, the logic 163 may back up the changed data 394, the changed information 383, along with the timestamps 353 and any changes in the access control policies 373, 374, 375, 363, 364, and 365 from the respective previous access control policies 273, 274, 275, 263, 264, and 265. The logic 163 may obtain the aforementioned changed data, changed information, and/or updated metadata by receiving through a transmission, or by extracting from the second infrastructure 101, including the second storage spaces 114. In some examples, the back up corresponding to the timestamp 353 may be limited to the changed data 394, the changed information 383, along with the timestamps 353 and any changes in the access control policies 373, 374, 375, 363, 364, and 365. Thus, any data, information, or metadata that remains unchanged, is not backed up. In some examples, the logic 163 may refrain from or skip performing an incremental backup unless an amount of the changed data 394 and the changed information 383 exceeds a threshold size, in order to potentially reduce a number of stored backups.

The logic 163 may obtain the snapshot of the raw data 233, 334, and 235 and the additional information 343, 244, and 245 corresponding to the common timestamp 353. The obtaining of the snapshot may encompass receiving the snapshot, as transmitted by the logic 113, or extracting the snapshot from the second storage spaces 114. The logic 163 may determine whether the backup is validated by comparing hash representations and/or fingerprints of the backed up raw data, additional information, and/or metadata, to fingerprints 313, 314, 315, 323, 324, and 325. The fingerprints corresponding to the backup identify contents and/or metadata of a completed backup. Meanwhile, the fingerprints 313, 314, 315, 323, 324, and 325 may correspond to the raw data 233, 334, and 235, the additional information 343, 244, and 245, and the metadata within the second infrastructure 101. This validation may occur at a checkpoint. If the respective fingerprints of the backup match those within the second infrastructure 101, the logic 163 may validate the backup. This comparison of fingerprints is illustrated further in FIG. 7.

Figure 4:
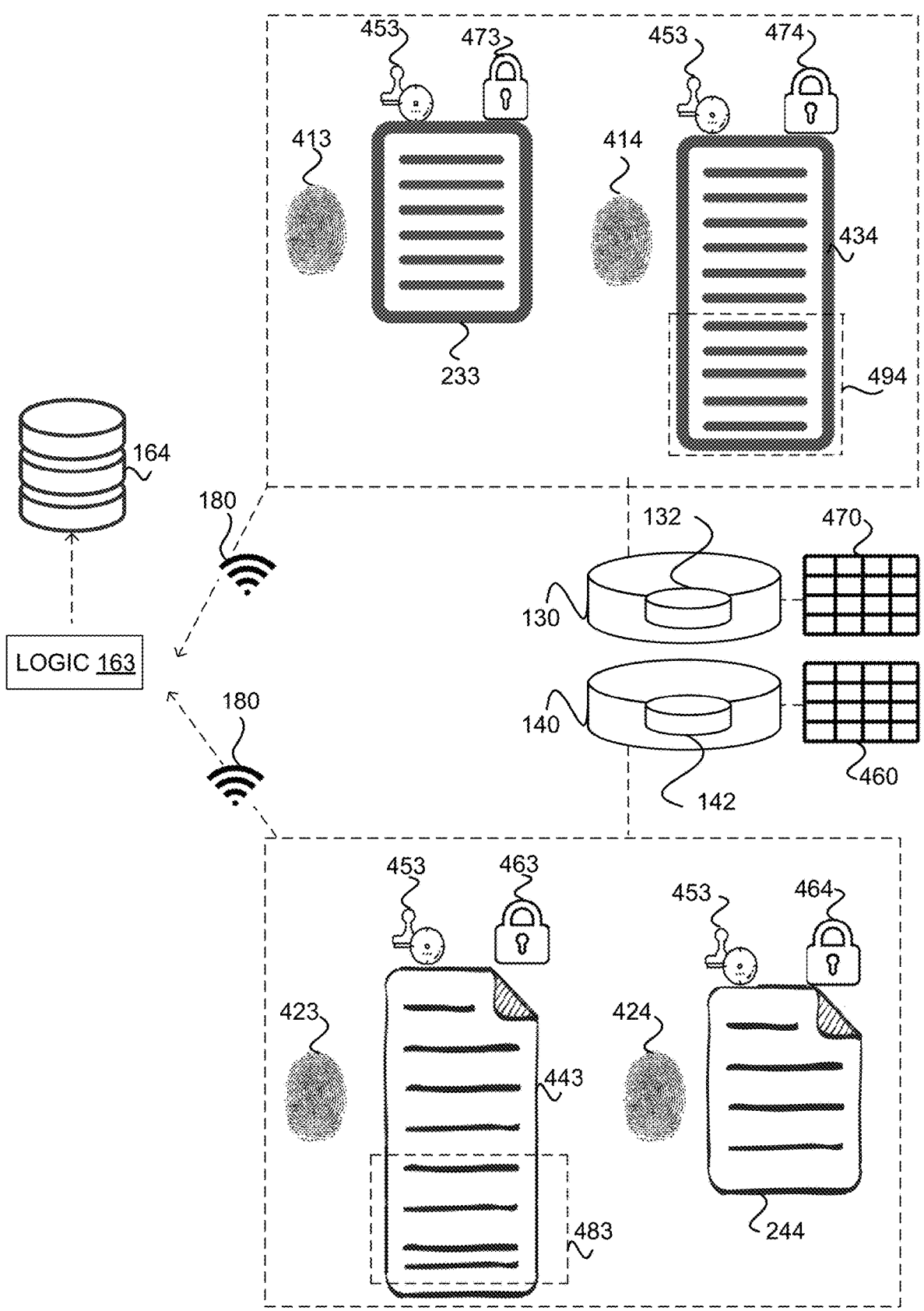
FIG. 4 illustrates, in accordance with various examples, operations of incrementally backing up raw data and additional information.

In a same or similar manner to that illustrated in FIG. 2A, parameters or characteristics of the backing up of changed data 394, the changed information 383, and any updates in metadata, may depend on the attributes of the network connection 180 between the first infrastructure 101 and the second infrastructure 151. Also in a same or similar manner to that illustrated in FIG. 2A, the snapshot corresponding to the timestamp 353 may be stored in the first section 130 and the second section 140 and indexed by updated indices 370 and 360, respectively Next, FIG. 4 illustrates a continuing of the backup process from FIG. 2A. In FIG. 4, the logic 163 may perform an incremental backup that further backs up, loads, or saves changes in the raw data 233, 234, and 235, and the additional information 243, 244, and 245 into the first storage spaces 164, which have occurred since the timestamp 253. In particular, the logic 163 may obtain such changes corresponding to an updated timestamp 453 at an updated snapshot. Therefore, the changes would have occurred between the timestamps 453 and 253. Here, the raw data 233 may be unchanged at the timestamp 453. Meanwhile, the raw data 234 may have changed to raw data 434 at the timestamp 453. Differences between the raw data 234 and the raw data 434 are encapsulated by changed data 494. The changed data 494 may, for example, have incorporated or merged a subset (e.g., a portion or all of) the raw data 235. The raw data 235 may have been deleted or merged into the raw data 234. Meanwhile, any changes in access control policies 473 and 474, of the raw data 233 and 434, respectively, relative to the access control policies 273 and 274, may also be uploaded, saved, or backed up into the first storage spaces 164.

Here, access control policies 474 may have been changed compared to the access control policies 274. For example, if the raw data 234 has been merged with the raw data 235, then classification by aggregation or classification by compilation may apply. In that situation, two or more data resources, when integrated (e.g., aggregated, compiled, joined, or merged), may have a higher classification level compared to when each of the resources exist individually. This higher classification level may stem from an additional association being revealed or inferred as a result of the resources being integrated. For example, this additional association may be between two entities, one of which is described in a first resource, for example, the raw data 234, and another of which is described in a second resource, for example, the raw data 235, when the first resource and the second resource are integrated. Additionally, when two or more resources are integrated, other constraints such as dissemination controls or release controls may be different compared to when each of the resources exist individually.

Similarly, the additional information 243 may have changed to additional information 443. Differences between the additional information 243 and the additional information 443 are encapsulated by changed information 483. The changed information 483 may, for example, have incorporated or merged a subset of the additional information 245, which may have been deleted. Meanwhile, any changes in access control policies 463 and 464, compared to the access control policies 263 and 264, of the additional information 443 and 244, respectively, may also be uploaded, saved, or backed up into the first storage spaces 164.

Here, access control policies 464 may have been changed compared to the access control policies 264, for example, due to classification by aggregation or classification by compilation, in a same or similar manner as described above in reference to the access control policies 474.

Therefore, the logic 163 may obtain the snapshot corresponding to the timestamp 453 and determine changes with respect to the timestamp 253. The changes may include changed data 494, an indication that the raw data 235 has been deleted, the changed information 483, and an indication that the additional information 245 has been deleted, along with any changes in metadata including changes in the access control policies 473, 474, 463, and 464. The access control policies 473, 474, 463, and 464 correspond to the raw data 233 and 434, and the additional information 443 and 244, respectively. The obtaining may include passively receiving a transmission or extracting the aforementioned from the second infrastructure 101.

Therefore, the logic 163 may back up the changed data 494, the changed information 483, along with the timestamp 453 and any changes in the access control policies 473, 474, 463, and 464, and delete the previous raw data 234 and the additional information 244 in the current backup corresponding to the timestamp 453.

The logic 163 may determine whether the backup is validated by comparing hash representations and/or fingerprints of the backed up raw data, additional information, and/or metadata, to fingerprints 413, 414, 423, and 424. The fingerprints corresponding to the backup identify contents and/or metadata of a completed backup. Meanwhile, the fingerprints 413, 414, 423, and 424 may correspond to the raw data 233 and 434, and the additional information 443, and 244, and the metadata within the second infrastructure 101. This validation may occur at a checkpoint. If the respective fingerprints of the backup match those within the second infrastructure 101, the logic 163 may validate the backup.

In a same or similar manner to that illustrated in FIG. 2A and FIG. 3, the logic 163 may adjust or determine parameters or characteristics of the backing up of changed data 494, the changed information 483, and any updates in metadata, depending on the attributes of the network connection 180 between the first infrastructure 101 and the second infrastructure 151. Also in a same or similar manner to that illustrated in FIG. 2A and FIG. 3, the snapshot corresponding to the timestamp 453 may be stored in the first and second sections 130 and 140 and indexed by updated indices 470 and 460, respectively.

Figure 5:
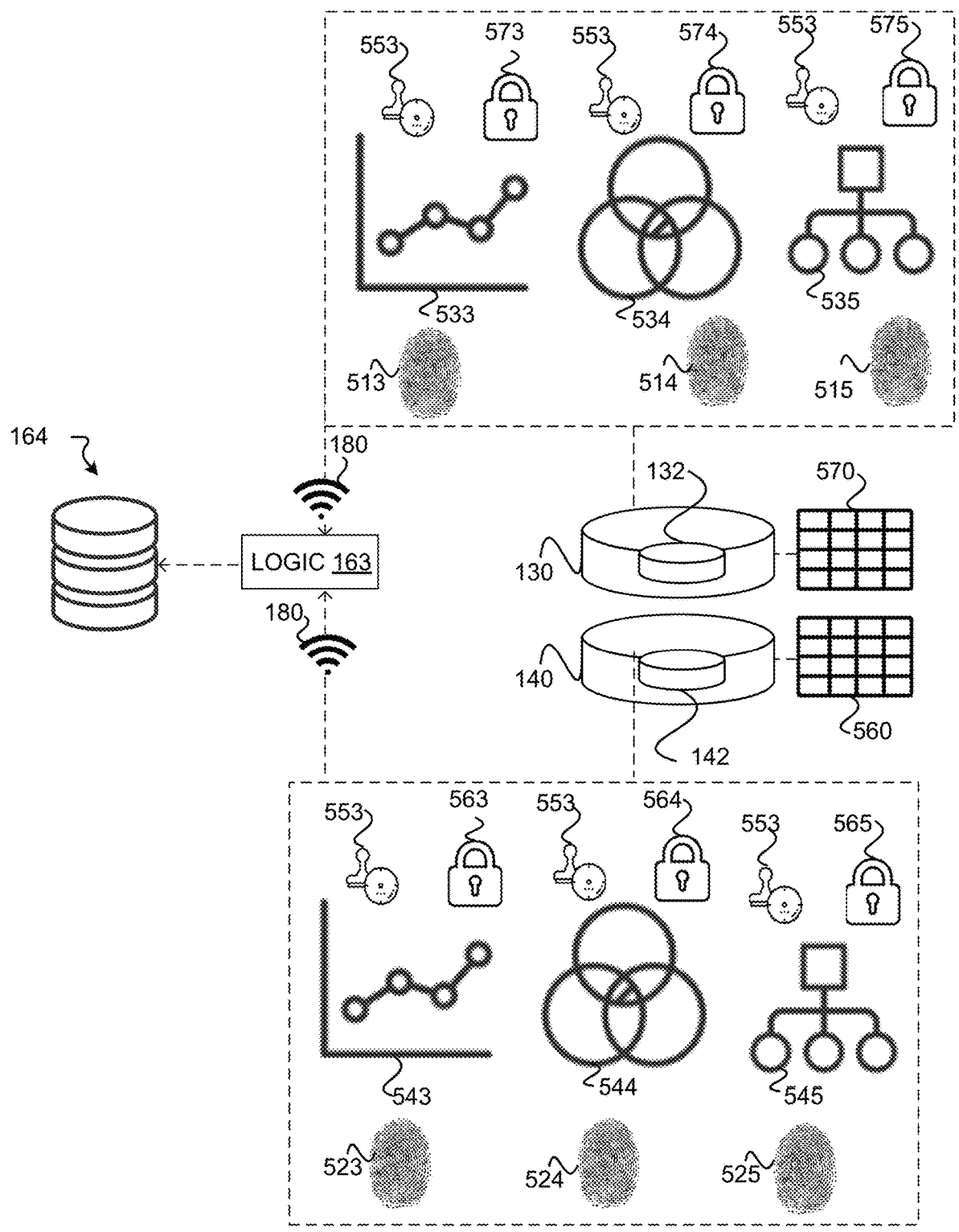
FIG. 5 illustrates, in accordance with various examples, operations of backing up raw data and additional information of a different format or representation (hereinafter "format"), such as graphical, diagrammatic, chart, or pictorial format.

FIG. 5 illustrates, in accordance with various examples, exemplary operations of backing up raw data and additional information of a different format or representation (hereinafter "format"), such as a graphical, diagrammatic, chart, or pictorial format. Principles illustrated and described with respect to FIGS. 1-4 may also be applicable and/or similar to those in FIG. 5. Here in FIG. 5, during an initial backup, the logic 163 may obtain raw data 533, 534, and 535 from the first section 130 and additional information 543, 544, and 545 from the second section 140 of the second storage spaces 114 of the second infrastructure 101. The raw data 533, 534, and 535 from the first section 130 and the additional information 543, 544, and 545 may be of a format such as a graphical, diagrammatic, chart, or pictorial format. In some examples, the raw data 533, 534, and 535 may have a different format compared to the additional information 543, 544, and 545. For instance, the former may be in a textual format while the latter may be in a graphical, diagrammatic, chart, or pictorial format. Although three pieces of the raw data, and three pieces of the additional information, are illustrated, the raw data and the additional information may include any number of pieces. The raw data 533, 534, and 535 may reside in different layers compared to the additional information 543, 544, and 545. The raw data 533, 534, and 535 may be indexed within the first section 130 using indices 570. The additional information 543, 544, and 545 may be stored in the first section 130 and the second section 140 and indexed by updated indices 570 and 560, respectively. The indices 570 and 560 may be implemented in a same or similar manner as the indices 270 and 260.

The raw data 533 may be timestamped with a timestamp 553 and have access control restrictions, levels, and/or policies (hereinafter "policies" 573) at a time corresponding to the timestamp 553. The timestamp 553 may correspond to a snapshot at which the raw data 533 was taken or obtained. The access control policies 573 may indicate specific users or classifications that are authorized to view the raw data 533, and/or an extent to which each classification is authorized to view the raw data 533. The access control policies 573 may also encompass dissemination controls or release controls. Similarly, the raw data 534 may be timestamped with the timestamp 553 and have access control policies 574. The raw data 535 may be timestamped with the timestamp 553 and have access control policies 575. Principles of the access control policies 574 and 575 may be implemented in a manner similar to the access control policies 573.

Meanwhile, the additional information 543 may be timestamped with the timestamp 553 and have access control policies 563. For example, the access control policies 563 may indicate that a particular first user has read and/or write access to the additional information 543. The particular first user may identify other users that have read and/or write access to the additional information. In some examples, only the first user has read and/or write access to the additional information 543. The additional information 544 may be timestamped with the timestamp 553 and have access control policies 564. The additional information 545 may be timestamped with the timestamp 553 and have access control policies 565. Principles of the access control policies 564 and 565 may be implemented in a manner similar to the access control policies 563.

Therefore, the logic 163 may back up the raw data 533, 534, and 535 and the additional information 543, 544, and 545 into the first storage spaces 164, and validate the backed up data, in a similar or same manner as that described with respect to FIGS. 2A, 2B, and 3-4.

Figure 6:
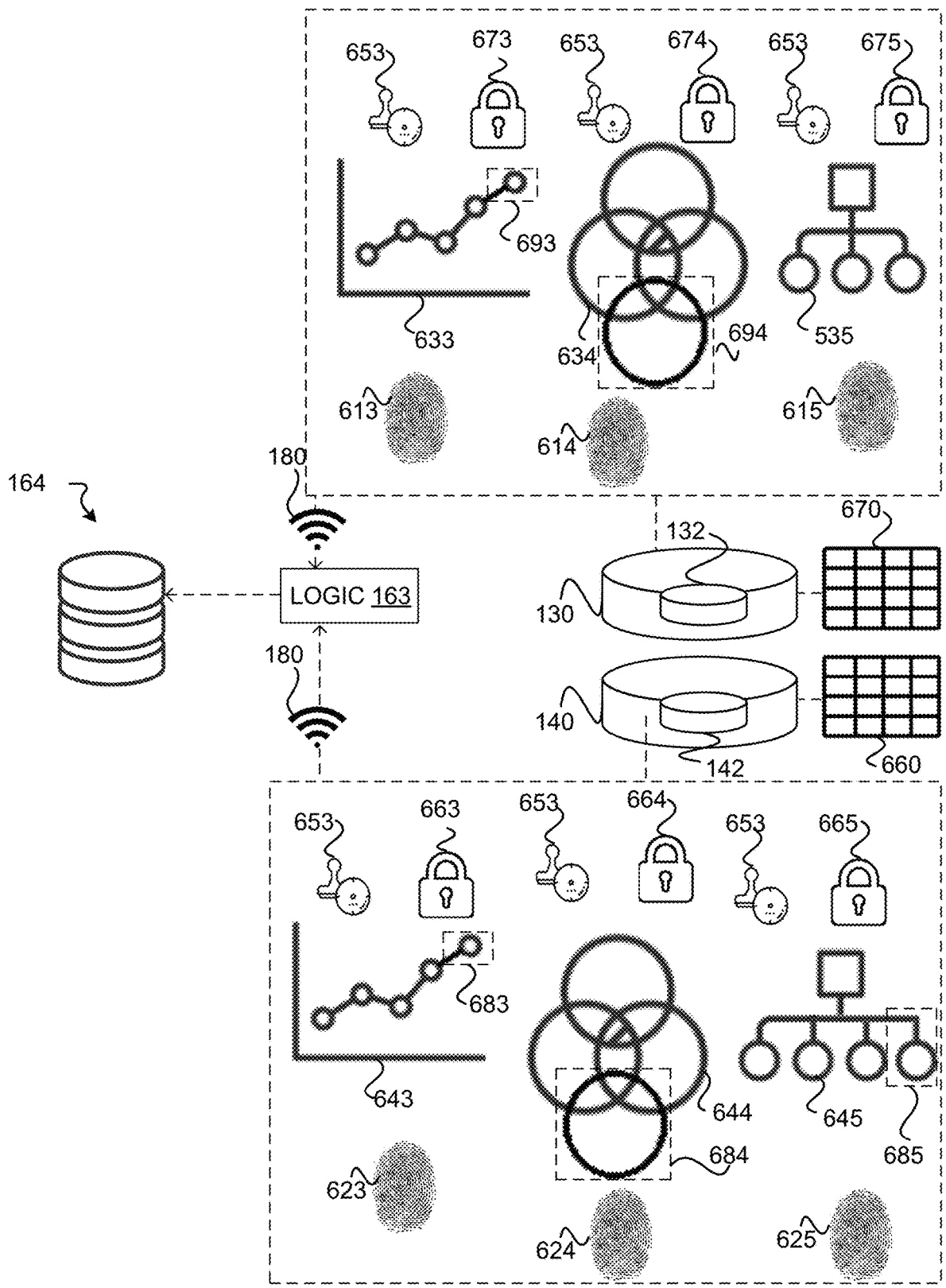
FIG. 6 illustrates, in accordance with various examples, operations of incrementally backing up raw data and additional information of a different format.

Next, FIG. 6 illustrates an incremental backup in the second storage spaces 164 following the initial backup of FIG. 5. In FIG. 6, the logic 163 may back up changes, between the timestamps 453 and 553, of the raw data 533, 534, and 535 and the additional information 543, 544, and 545, in a same or similar manner as that illustrated in FIGS. 3 and 4. In particular, the logic 163 may obtain such changes corresponding to an updated timestamp 653. Thus, the changes would have occurred between the timestamps 653 and 553. Here, the raw data 533 may have changed to raw data 633. The changes between the raw data 533 and 633 are encapsulated as changed data 693. The raw data 534 may have changed to raw data 634. The changes between the raw data 534 and 634 are encapsulated as changed data 694. The changed data 693 and 694 may include graphical or pictorial changes, such as additional connectors, nodes, or components, changes in existing connectors, nodes, or components, or deletions of previous connectors, nodes, or components. The raw data 535 may remain unchanged. Meanwhile, any changes in access control policies 673, 674, and 675, compared to the access control policies 573, 574, and 575, of the raw data 633, 634, and 535, respectively, may also be uploaded, saved, or backed up into the first storage spaces 164.

Similarly, the additional information 543 may have changed to additional information 643. Differences between the additional information 543 and the additional information 643 are encapsulated by changed information 683. The changed information 683 may include modifications, additions, and/or deletions. The additional information 544 may have changed to additional information 644. Differences between the additional information 544 and the additional information 644 are encapsulated by changed information 684. The additional information 545 may have changed to additional information 645. Differences between the additional information 545 and the additional information 645 are encapsulated by changed information 685. The changed information 683, 684, and 685 may include graphical or pictorial changes, such as additional connectors, nodes, or components, changes in existing connectors, nodes, or components, or deletions of previous connectors, nodes, or components. In a same or similar manner to that illustrated in FIGS. 2A, 2B, and 3-5, the snapshot corresponding to the timestamp 653 may be stored in the first section 130 and the second section 140 and indexed by updated indices 670 and 660, respectively.

Meanwhile, any changes in access control policies 663, 664, and 665, compared to the access control policies 563, 564, and 565, of the additional information 643, 644, and 645, respectively, may also be uploaded, saved, or backed up into the first storage spaces 164.

In summary, the logic 163 may back up or store, in the first storage spaces 164, the changed data 693 and 694, and the changed information 683, 684, and 685, along with changes in metadata such as changes in the access control policies 673, 674, 675, 663, 664, and 665.

Figure 7:
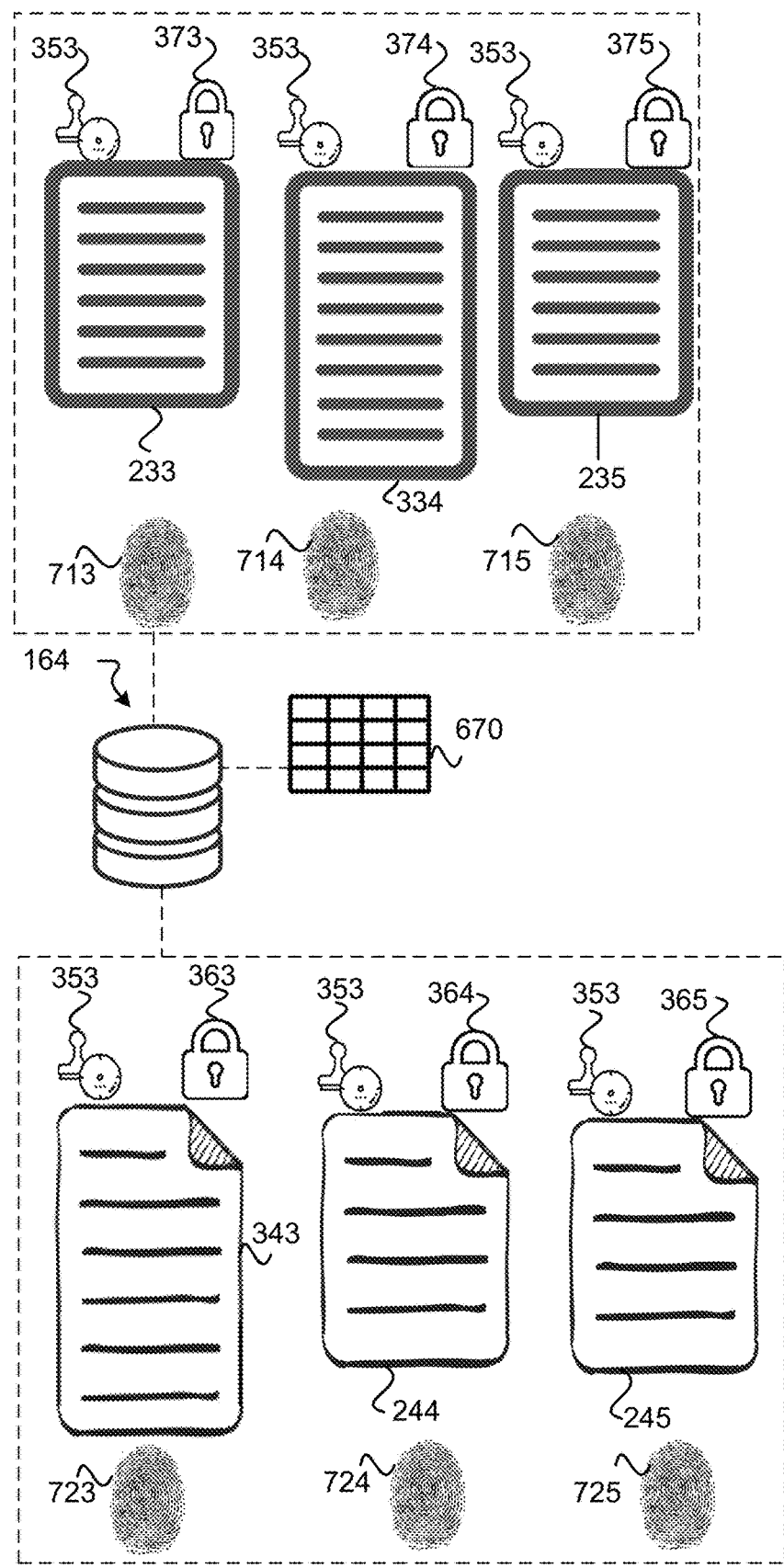
FIG. 7 illustrates, in accordance with various examples, operations of obtaining fingerprints of backed up raw data and additional information.

FIG. 7 expands upon concepts of FIG. 3, following the backing up of the raw data 233, 334, and 235 and the additional information 343, 244, and 245 in the first storage spaces 164. The logic 163 may store and organize the backup using an index 670. In FIG. 7, the logic 163 may obtain hash representations and/or fingerprints (hereinafter "fingerprints") that identify contents and/or metadata of a completed backup. In particular, following the backup, the logic 163 may obtain fingerprints 713, 714, and 715 corresponding to the raw data 233, 334, and 235, respectively. The logic 163 may also obtain fingerprints 723, 724, and 725 corresponding to the additional information 343, 244, and 245, respectively. The logic 163 may compare the fingerprints 713, 714, 715, 723, 724, and 725, which correspond to the backup, to the fingerprints 313, 314, 315, 323, 324, and 325, respectively, which correspond to the original raw data and additional information within the second infrastructure 101. If the fingerprints match, then the logic 163 validates the backup. However, if the fingerprints fail to match, then the logic 163 may reperform the backup, or a portion of the backup corresponding to non-matching fingerprints. For example, if the fingerprints 714 and 314 fail to match, then the logic 163 may retransfer the raw data 334. However, if the backup in FIG. 2A is validated, confirmed, or verified to correctly match the original raw data and additional information, then the cause of the non-matching fingerprints would be the changed data 394, so the logic 163 may retransfer the changed data 394 without transferring the raw data 334. In some examples, the logic 163 may determine a nature of a difference between two fingerprints and determine a cause of the non-matching fingerprints. In particular, the logic 163 may determine whether the raw data and/or the additional information was incorrectly copied, or whether the backup ended prematurely.

Figure 8:
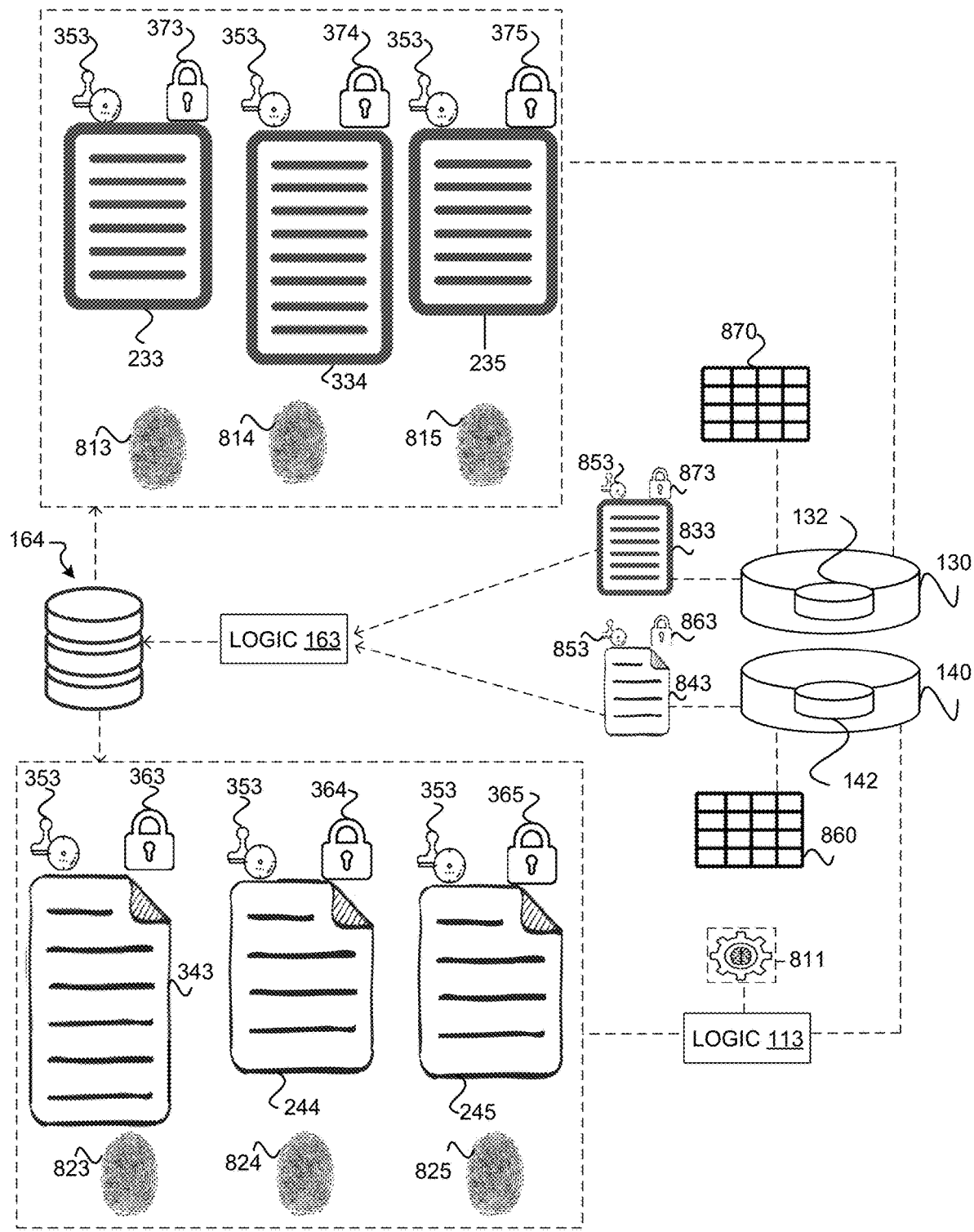
FIG. 8 illustrates, in accordance with various examples, operations of restoring raw data of a previous backup while backing up a new version.

FIG. 8 illustrates a next stage of a restoring operation. In FIG. 8, the raw data 233, 334, and 235, and the additional information 343, 244, and 245, corresponding to the timestamp 353, is restored, from the first infrastructure 151 to the second infrastructure 101. Although not illustrated, in some examples, the restore may occur at different computing systems or infrastructures, or multiple different computing systems or infrastructures from a single backup, sometimes simultaneously or partially simultaneously. In particular, the restoring transfers an existing, or most recent, backup, from the storage spaces 164 to the first section 130 and the second section 140 of the second storage spaces 114, for example, via an API. The logic 113 may create a checkpoint, in a similar manner to the checkpoint during the backup process, to verify consistency between the backup and the restore. Following the restore, the logic 113 may obtain fingerprints of the resulting restore, which include fingerprints 813, 814, and 815 of the raw data 233, 334, and 235, and fingerprints 823, 824, and 825 of the additional information 343, 244, and 245, respectively. The logic 113 may compare the aforementioned fingerprints to the fingerprints 713, 714, 715, 723, 724, and 725 of the backup to verify whether the restore was correctly performed. If each of the respective fingerprints between the restore of the second infrastructure 151 and the backup of the first infrastructure 101 match, then the logic 113 verifies that the restore was correctly performed. Otherwise, the logic 113 may reperform the restore or a portion thereof that corresponds to any non-matching fingerprints. The logic 113 may store the raw data 233, 334, and 235 separate from the additional information 343, 244, and 245, for example, in the first section 130 and the second section 140, respectively. Additionally or alternatively, the raw data 233, 334, and 235 may be populated or distributed into different layers compared to the additional information 343, 244, and 245. The restored raw data 233, 334, and 235 may be indexed by an index 860, which may indicate a timestamp, version, and/or other attributes or characteristics of the raw data restored. Similarly, the restored additional information 343, 244, and 245 may be indexed by an index 870, which may indicate a timestamp, version, and/or other attributes or characteristics of the additional information restored.

The restore at the second infrastructure 101 does not interfere with or slow down a backup process. As illustrated in FIG. 8, another more updated backup process may occur simultaneously with the restore. For example, a backup that is to be restored may be replicated to a second set of folders or a second location, from which the restore may be run. For example, the logic 163 may back up raw data 833 having a timestamp 853, which is more recent compared to the timestamp 353, and additional information 843 having the same timestamp 853. The raw data 833 has access control privileges 873 and the additional information has access control privileges 863. As a result of preventing such interruptions, both the backup process and the restore process may be expedited.

The logic 113 of the second infrastructure 101 may confirm a successful restore by returning a checksum. A successful restore may include a correct number of files or amount of data transferred, and a proper location that the files or data are transferred to. The logic 163 of the first infrastructure 151 may validate this checksum.

In some examples, the logic 113 may determine or adjust specific characteristics or attributes of the restoring process, based on certain network parameters or conditions, and/or amount, type, or format of data to be restored, similar to that described in FIGS. 2A and 2B. Additionally, metrics, parameters, and/or characteristics of a restore process may be constantly monitored, conceptually in a same or similar manner as that described for the backup process in FIGS. 2A and 2B. If certain performance indicators, such as rate of transfer during the restore, fall below certain thresholds over a certain duration of time, or at any specific instance of time, the restore process may be paused or terminated by the logic 113. In some examples, a combination of certain performance indicators and network conditions both failing to satisfy respective threshold conditions may cause the restore process to be paused or terminated. A machine learning component 811 may be implemented using same or similar principles as the machine learning component 161, and may at least partially perform such determinations.

Figure 9:
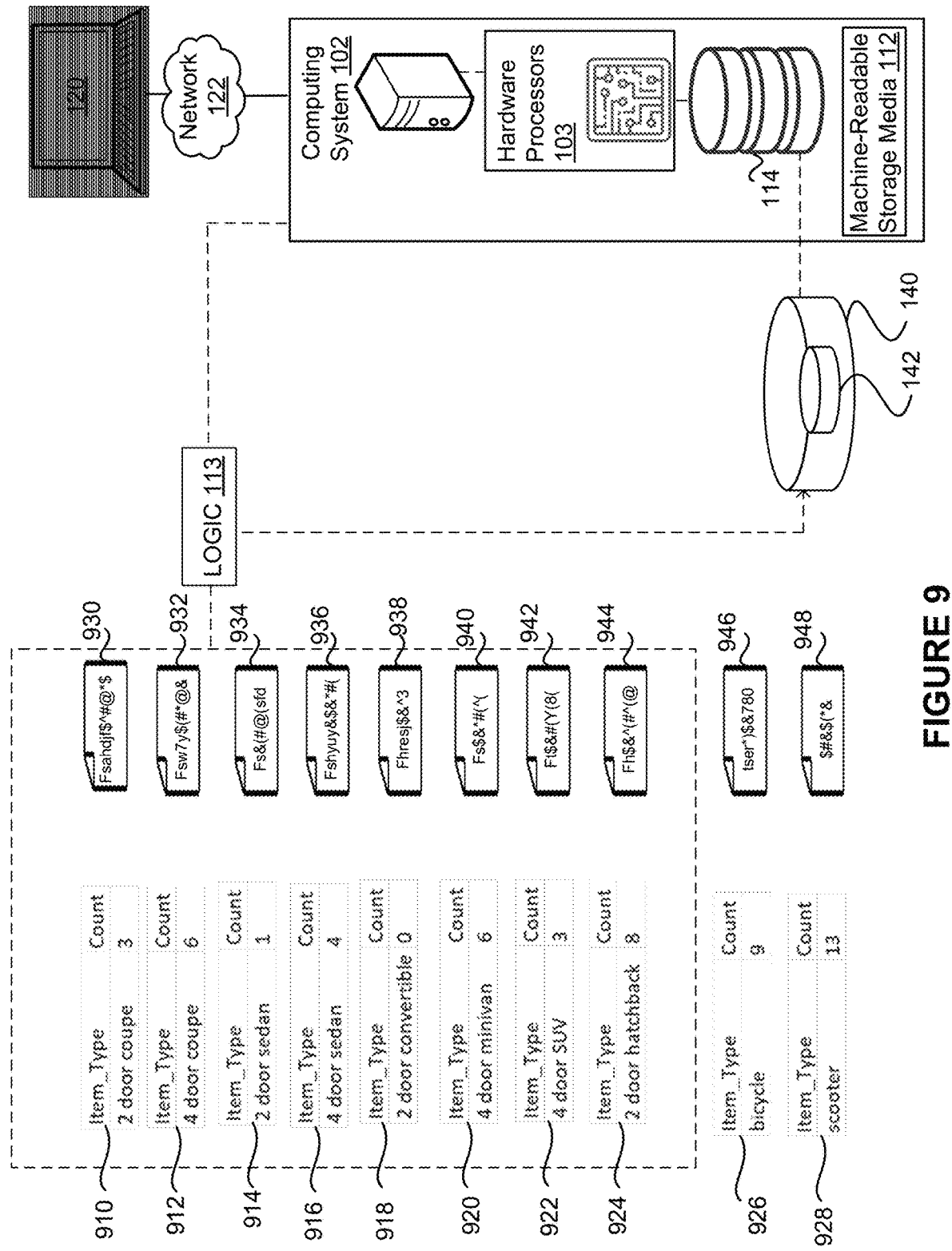
FIG. 9 illustrates, in accordance with various examples, operations of obtaining keys of the backed up raw data and/or additional information, determining a hashed value or representation (hereinafter "hashed value") of the keys or one or more entries corresponding to the keys, and determining a particular server based on the hashed value.

FIG. 9 illustrates a particular restoring process in which data is distributed to particular servers, nodes, locations, or infrastructures. For example, data that may be related, such as data that is part of a same table or relational database, may be distributed to a same location or server. In some examples, certain portions of one or more locations or servers, such as particular caches or keyspaces, may be purged or cleared, before placing data within such locations or servers. Here, in FIG. 9, data segments 910, 912, 914, 916, 918, 920, 922, 924, 926, and 928 may have identifiers "Item_Type." The identifiers may identify a type of a data entry, and/or constitute a basis for which to determine a location of the data segments. In other words, "Item_Type," rather than "Count," may be a basis to distinguish where to place the data entries. Similar item types may be distributed to same or similar locations. Entries under the identifiers, such as "2 door coupe," "4 door couple," and "2 door sedan," constitute keys. The logic 113 may determine respective hash values or hash representations (hereinafter "hashed values") of entries under the "Item_Type" identifiers for each of the aforementioned data segments 910, 912, 914, 916, 918, 920, 922, 924, 926, and 928. Specifically, the logic 113 may determine a hashed value 930 of "2 door coupe" under "Item_Type," corresponding to the data segment 910. Here, "2 door coupe" may constitute a key of the data segment 110. In this manner, the logic 113 may determine hashed values 932, 934, 936, 938, 940, 942, 944, 946, and 948 of data entries under "Item_Type," corresponding respectively to the data segments 912, 914, 916, 918, 920, 922, 924, 926, and 928. Each specific server or location may be mapped to a range of hashed values. For example, the logic 113 may map the hashed values 930-944 to the second section 140, while the hashed values 946 and 948 may be mapped somewhere else. In such a manner, data that may be more closely related, as determined using criteria of the key, may be stored in same or similar locations or servers. Entries having common keys will be stored in same locations. Throughputs of data operations may be improved, especially within a distributed architecture, which may be implemented in conjunction with FIG. 9.

Figure 10A:
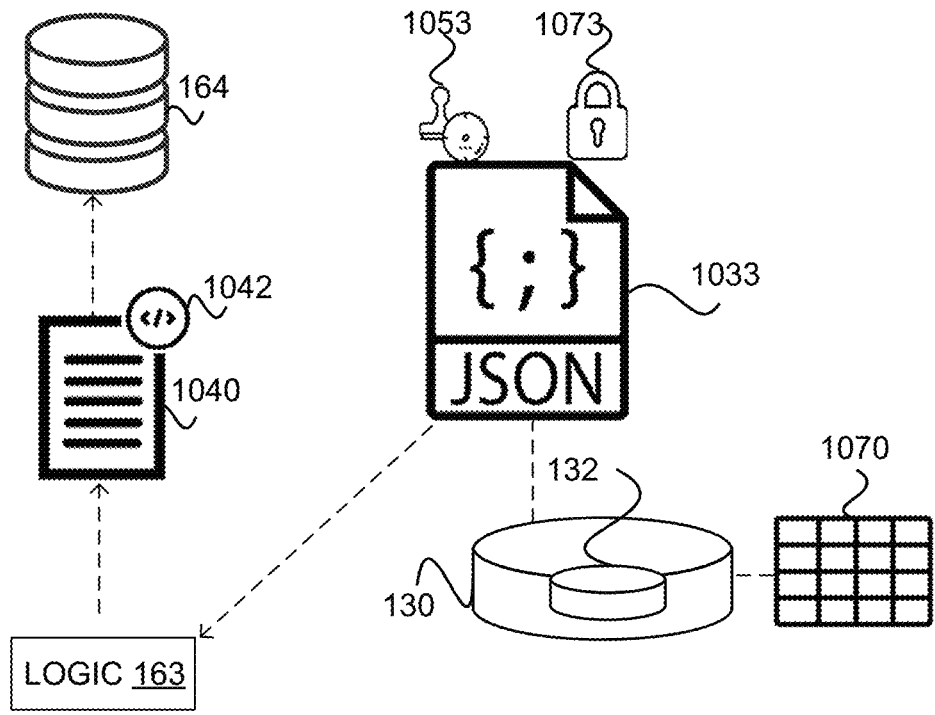
FIG. 10A illustrates, in accordance with various examples, operations of retrieving, for a backup, data from a server or database (hereinafter "database") that houses documents or files (hereinafter "files") of one or more particular formats such as a JSON format.

FIG. 10A illustrates a backup process applied to data, or documents, that have a specific format. This specific format may be specific to, or compatible with, a particular server and/or a distributed architecture. For example, the specified format may include a JSON format. Each document in the specified format may include a set of keys such as names of fields or properties, and corresponding values which may encompass strings, numbers, Booleans, dates, arrays of values, geolocations, or other data types. For example, one document may be stored within the first section 130, which may be associated with an index 1070 used for retrieval of documents. In FIG. 10A, the logic 163 may convert a document 1033 that has the specified format to be compatible with the first storage spaces 164. The document 1033 may have a timestamp 1053 and access control policies 1073. The document 1033 may be converted into a document 1040, for example, using a wrapper. The document 1040 may be a non-JSON format and may include metadata 1042 indicating an original formatting of the document 1033.

Figure 10B:
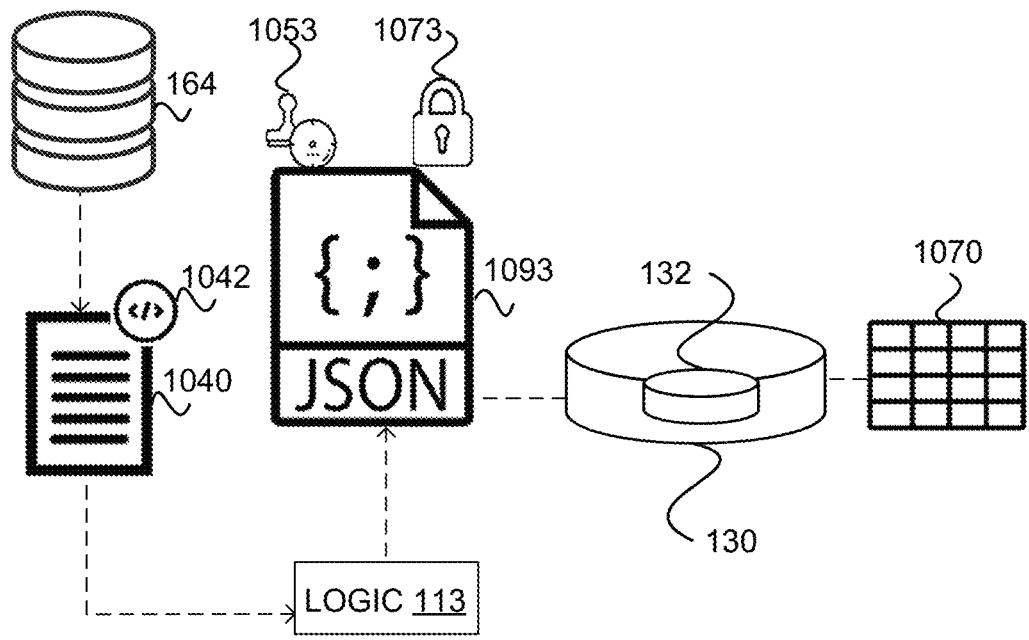
FIG. 10B illustrates, in accordance with various examples, operations of restoring data to the database in one or more particular formats.

FIG. 10B illustrates a restore process applied to data that is ingested into a particular server, which may be part of a distributed architecture. The particular server may have specific formatting requirements for documents. For example, the formatting requirements may include a JSON format. Therefore, the logic 113 may convert the document 1040 into a document 1093, same or similar as the document 1033, such that the document 1093 has a JSON format. Other conversions may be performed in order to make the document 1040 compatible with the particular server. The conversion may involve using a wrapper.

Figure 11:
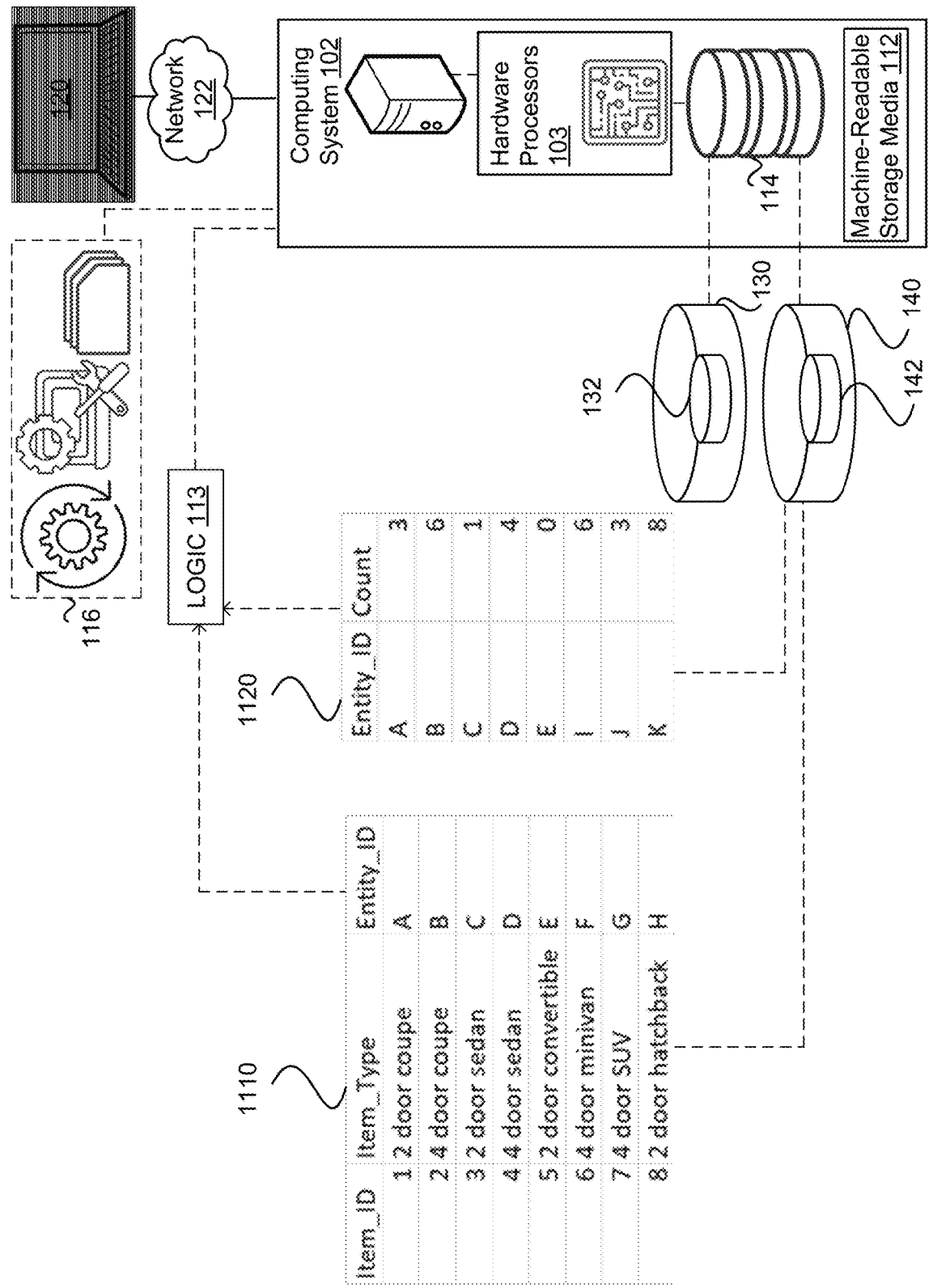
FIG. 11 illustrates, in accordance with various examples, operations of a platform.

FIG. 11 illustrates an operation, for example, performed by the platform 116, following the restore. In some examples, the restore process also encompasses restoring of the platform 116 and/or other functionalities of the second infrastructure 101. The platform 116 may perform functions such as querying, searching or retrieving, joining, merging, forming a union, parsing, and/or other data transformations or analyses. As only an example, the platform 116 in FIG. 11 may perform joining of datasets 1110 and 1120. The operations of the platform 116, following the restoration of the platform, may also be checked for validity. For example, outputs of data analyses or transformations may be checked, and/or metrics of operation of the platform 116 may be checked against threshold conditions to determine operability of the platform 116.

Figure 12:
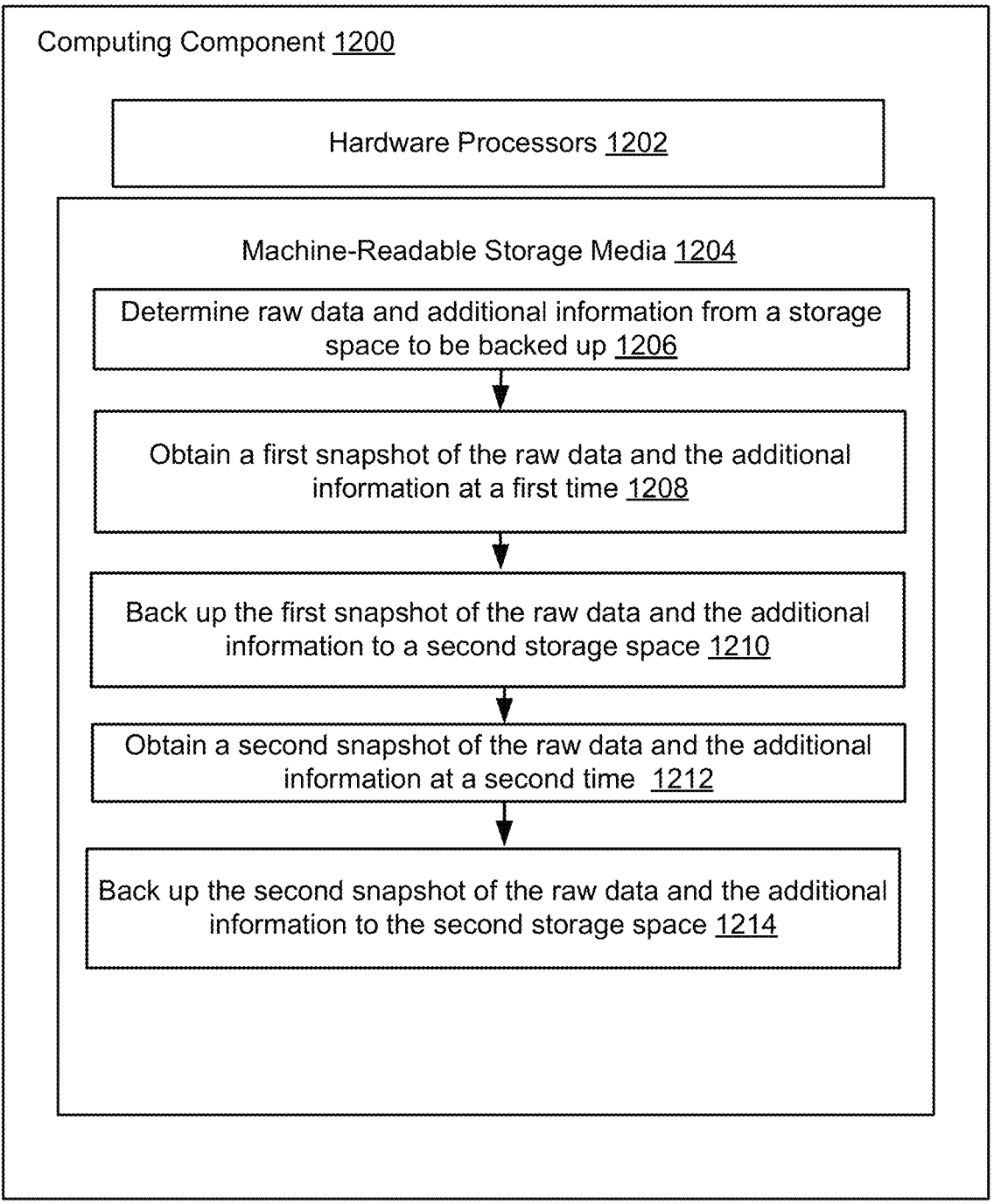
FIG. 12 illustrates, in accordance with various examples, a flowchart of an example method consistent with FIGS. 1, 2A, 2B, 3-9, 10A, 10B, and 11, embodied in a computing component.

FIG. 12 illustrates a computing component 1200 that includes one or more hardware processors 1202 and machine-readable storage media 1204 storing a set of machine-readable/machine-executable instructions that, when executed, cause the hardware processor(s) 1202 to perform an illustrative method of ingesting data, and formulating concepts from the ingested data, among other steps. It should be appreciated that there can be additional, fewer, or alternative steps performed in similar or alternative orders, or in parallel, within the scope of the various embodiments discussed herein unless otherwise stated. The computing component 1200 may be implemented as the computing system 102 or 152 of FIGS. 1-9, 10A, 10B, and 11. The hardware processors 1202 may be implemented as the hardware processors 103 or 153 of FIGS. 1-9, 10A, 10B, and 11. The machine-readable storage media 1204 may be implemented as the machine-readable storage media 112 or 162 of FIGS. 1-9, 10A, 10B, and 11, and may include suitable machine-readable storage media described in FIG. 13.

At step 1206, the hardware processor(s) 1202 may execute machine-readable/machine-executable instructions stored in the machine-readable storage media 1204 to determine raw data and additional information from a storage space to be backed up. The raw data and the additional information that is to be backed up may be represented using a graph. For example, the graph may indicate which data is to be transferred, which datasets are to be rebuilt, and which portions of data are to be snapshotted. The storage space to be backed up is illustrated in FIGS. 1-9, 10A, 10B, and 11, and as being located on a separate computing system compared to where the hardware processor(s) 1202 reside, but in some scenarios, the storage space to be backed up may be located on a same computing system as where the hardware processor(s) 1202 reside. The raw data and the additional information may include a subset of data within the computing system that cannot be generated or derived from other data. For example, derivative data may be at least partially excluded from the subset of data. In some examples, the subset of data may be selected based on a frequency of access or utilization of data. Specifically, the subset of data may be limited to data having highest access or utilization rates or occurrences, and/or having access or utilization rates or occurrences above respective thresholds.

In some examples, as previously explained with respect to FIGS. 1 and 2, the raw data and the additional information may differ in their respective storage and persistence requirements or characteristics and thus may occupy separate layers, and/or be stored separately. The raw data may include unmodified data, which is write-protected or write-restricted, and/or can only be written over from or modified by particular sources. In some examples, the raw data may not be modified or modifiable by users. The additional information may encompass user-created or user-modified data or information. In some examples, the user-modified data or information may be write-privileged for a specific user or subset of users.

In step 1208, the hardware processor(s) 1202 may execute machine-readable/machine-executable instructions stored in the machine-readable storage media 1204 to obtain a first snapshot of the raw data and the additional information at a first time, as illustrated, for example, in FIG. 2A. The obtaining of the first snapshot may entail extracting, from a storage space of the computing system, the first snapshot, or receiving the first snapshot. The first snapshot may synchronize a state of the raw data and the additional information, thereby eliminating temporal conflicts between the raw data and the additional information.

In step 1210, the hardware processor(s) 1202 may execute machine-readable/machine-executable instructions stored in the machine-readable storage media 1204 to back up the first snapshot of the raw data and the additional information to a separate storage space, as illustrated, for example, in FIGS. 2A, 2B, and 5. The backing up may be to a separate storage space compared to the storage space of the computing system. The backing up may result in both the raw data and the additional information being stored in a common storage space.

The backing up may include determining parameters of the backup, for example, a number of sessions in the backup and an amount of data per session. The parameters may be determined based on attributes of a network connection between locations of the storage space and the separate storage space, as well as an amount of data, types, and/or formats of data to be backed up. The network connection may include a HTTPS (Hypertext Transfer Protocol Secure) connection. For example, the attributes may include a speed, a stability, and/or a bandwidth of the network connection, current and/or historical, such as within a previous 24 hours.

In step 1212, the hardware processor(s) 1202 may execute machine-readable/machine-executable instructions stored in the machine-readable storage media 1204 to obtain a second snapshot of the raw data and the additional information at a second time subsequent to the first time, as illustrated, for example, in FIGS. 3, 4, and 6. In step 1214, the hardware processor(s) 1202 may execute machine-readable/machine-executable instructions stored in the machine-readable storage media 1204 to back up the second snapshot of the raw data and the additional information to the storage space. In such a manner, only raw data and additional information that has changed from the first time to the second time is backed up, which consumes less space.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hardwired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 13:
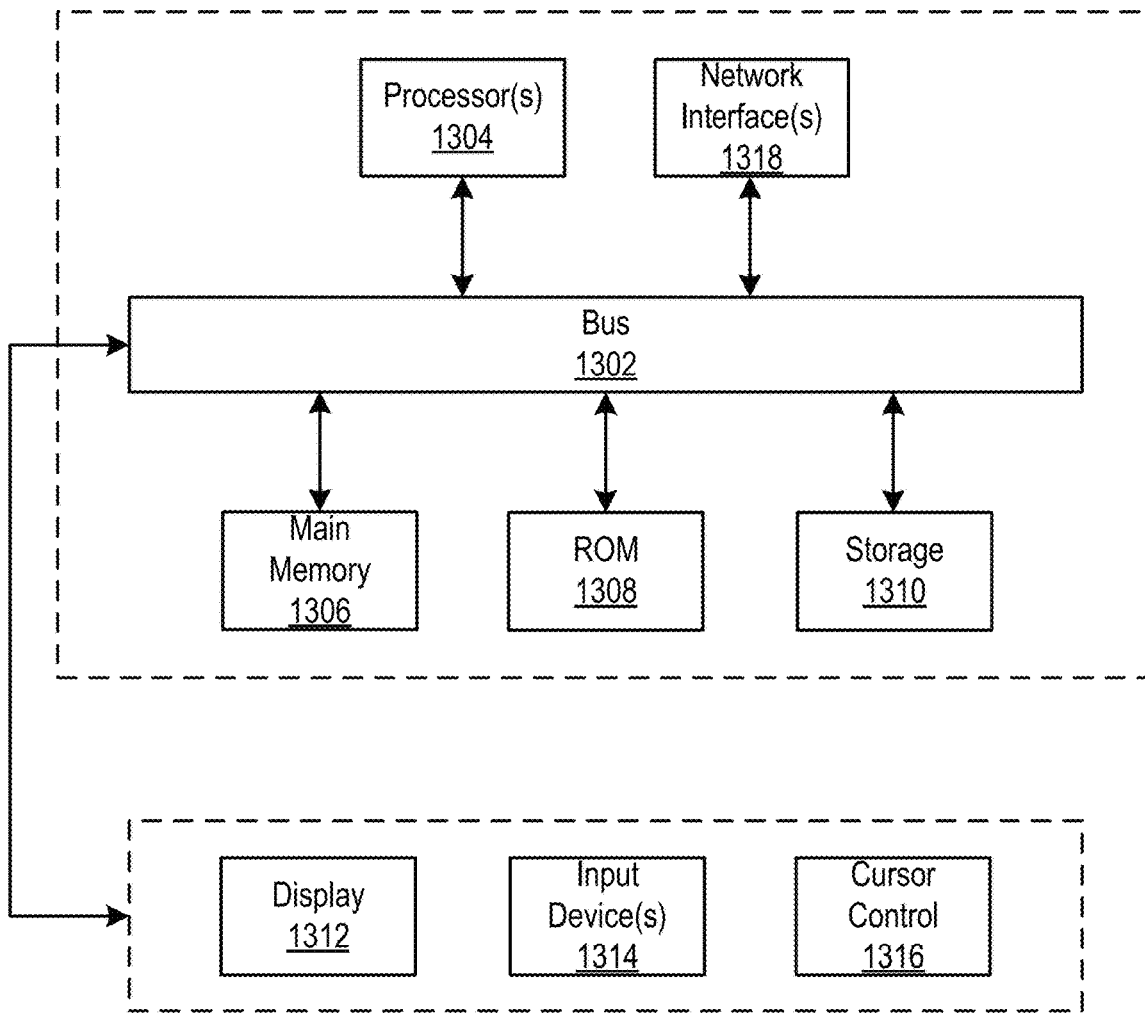
FIG. 13 illustrates a block diagram of an example computer system in which any of the embodiments described herein may be implemented.

FIG. 13 is a block diagram that illustrates a computer system 1300 upon which any of the embodiments described herein may be implemented. In some examples, the computer system 1300 may include a cloud-based or remote computing system. For example, the computer system 1300 may include a cluster of machines orchestrated as a parallel processing infrastructure. The computer system 1300 includes a bus 1302 or other communication mechanism for communicating information, one or more hardware processors 1304 coupled with bus 1302 for processing information. Hardware processor(s) 1304 may be, for example, one or more general purpose microprocessors.

The computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

The computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

The computer system 1300 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieves and executes the instructions. The instructions received by main memory 1306 may optionally be stored on storage device 1310 either before or after execution by processor 1304.

The computer system 1300 also includes a communication interface 1318 coupled to bus 1302. Communication interface 1318 provides a two-way data communication coupling to one or more network links that are connected to one or more local networks. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicated with a WAN). Wireless links may also be implemented. In any such implementation, communication interface 1318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1318, which carry the digital data to and from computer system 1300, are example forms of transmission media.

The computer system 1300 can send messages and receive data, including program code, through the network(s), network link and communication interface 1318. In the Internet example, a server might transmit a requested code for an application program through the Internet, the ISP, the local network and the communication interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A computing system, comprising:
one or more processors; and
memory storing instructions that, when executed by the one or more processors, cause the system to:
determine a previous backup comprising raw data and additional information from a first storage space of the computing system to be restored at a second storage space of the computing system, wherein the raw data and the additional information have different storage and persistence characteristics;
perform, within the second storage space of the computing system, an initial restore based on the previous backup within the second storage space of the computing system;
simultaneously with the performing of the initial restore, receive an updated backup corresponding to an updated version of the raw data and the additional information within the first storage space of the computing system; and perform, within the second storage space of the computing system, an updated restore based on the updated backup within the first storage space of the computing system.

2. The computing system of claim 1, wherein the initial restore occurs over multiple sessions, the initial restore comprising transmitting an amount of data during each session depending on a quality of a network connection of a network between the first storage space and the second storage space.

3. The computing system of claim 1, wherein the instructions that, when executed by the one or more processors, cause the computing system to:

receive, following the initial restore, an indication of the updated version of the raw data; and in response to receiving the indication, perform the second restore.

4. The computing system of claim 1, wherein the raw data and the additional information comprise files; and the instructions that, when executed by the one or more processors, cause the computing system to:

compare hash representations of files following restoration with hash representations of files stored in the first storage space to determine a validity of the restoration.

5. The computing system of claim 1, wherein the instructions that, when executed by the one or more processors, cause the computing system to:

restore one or more repositories and one or more platforms, wherein the repositories segregate the raw data from the additional information.

6. The computing system of claim 1, wherein the instructions that, when executed by the one or more processors, cause the computing system to:

obtain keys of the raw data;

determine a hashed value of the keys;

determine, based on the hashed values, one or more particular servers corresponding to the second storage space to which the raw data is to be restored.

7. The computing system of claim 6, wherein the particular servers are each dedicated to specific ranges of hashed values.

8. The computing system of claim 1, wherein the instructions that, when executed by the one or more processors, cause the computing system to:

convert the raw data and the additional information to be initially restored into a JSON format prior to the initial restoration.

9. The computing system of claim 1, wherein the updated version of the raw data and the additional version comprises updated access control policies of the additional information compared to the additional information of the previous backup.

10. The computing system of claim 1, wherein the instructions that, when executed by the one or more processors, cause the computing system to:

terminate the initial restore or the updated restore based on a performance indicator.

11. A computer-implemented method of a computing system, the computer-implemented method comprising:

determining a previous backup comprising raw data and additional information from a first storage space of the computing system to be restored at a second storage space of the computing system, wherein the raw data and the additional information have different storage and persistence characteristics;

performing, within the second storage space of the computing system, an initial restore based on the previous backup within the second storage space of the computing system;

simultaneously with the performing of the initial restore, receive an updated backup corresponding to an updated version of the raw data and the additional information within the first storage space of the computing system; and performing, within the second storage space of the computing system, an updated restore based on the updated backup within the first storage space of the computing system.

12. The computer-implemented method of claim 11, wherein the initial restore occurs over multiple sessions, the initial restore comprising transmitting an amount of data during each session depending on a quality of a network connection of a network between the first storage space and the second storage space.

13. The computer-implemented method of claim 11, further comprising:

receiving, following the initial restore, an indication of the updated version of the raw data; and in response to receiving the indication, performing the second restore.

14. The computer-implemented method of claim 11, wherein the raw data and the additional information comprise files; and the computer-implemented method further comprises:

comparing hash representations of files following restoration with hash representations of files stored in the first storage space to determine a validity of the restoration.

15. The computer-implemented method of claim 11, further comprising:

restoring one or more repositories and one or more platforms, wherein the repositories segregate the raw data from the additional information, and wherein derivative data that is derived or generated from the raw data or the additional information is at least partially excluded from the backup.

16. The computer-implemented method of claim 11, further comprising:

obtaining keys of the raw data;

determining a hashed value of the keys; and determining, based on the hashed values, one or more particular servers corresponding to the second storage space to which the raw data is to be restored.

17. The method of claim 16, wherein the particular servers are each dedicated to specific ranges of hashed values.

18. The computer-implemented method of claim 11, further comprising:

converting the raw data and the additional information to be initially restored into a JSON format prior to the initial restoration.

19. The computer-implemented method of claim 11, wherein the updated version of the raw data and the additional version comprises updated access control policies of the additional information compared to the additional information of the previous backup.

20. The computer-implemented method of claim 11, further comprising:
 terminating the initial restore or the updated based on a performance indicator.

* * * * *